(12) United States Patent
Martinez

(10) Patent No.: US 8,004,680 B2
(45) Date of Patent: Aug. 23, 2011

(54) COLOR SENSOR PERFORMANCE

(75) Inventor: Oscar Martinez, Castelldefels (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 415 days.

(21) Appl. No.: 12/243,986

(22) Filed: Oct. 2, 2008

(65) Prior Publication Data

US 2009/0190126 A1  Jul. 30, 2009

Related U.S. Application Data

(60) Provisional application No. 61/023,265, filed on Jan. 24, 2008.

(51) Int. Cl.
*G01J 3/50* (2006.01)
(52) U.S. Cl. ............................ 356/402; 356/72; 356/425
(58) Field of Classification Search .................... 356/73, 356/300, 402, 425
See application file for complete search history.

(56) References Cited

U.S. PATENT DOCUMENTS

| | | | |
|---|---|---|---|
| 5,895,836 A | 4/1999 | Uzik |
| 6,088,095 A | 7/2000 | Sharma |
| 6,185,004 B1 | 2/2001 | Lin et al. |
| 6,351,308 B1 | 2/2002 | Mestha |
| 7,027,185 B2 | 4/2006 | Subirada et al. |
| 7,031,550 B2 | 4/2006 | Nakajima |
| 2006/0219014 A1 | 10/2006 | Turner et al. |

*Primary Examiner* — F. L Evans

(57) ABSTRACT

The present disclosure includes a number of method, medium, and apparatus claims utilized for color sensor performance. One method includes determining performance of a color sensor, which can be performed by measuring a color parameter intensity and reflectance spectral power distribution of a particular type of print medium with a color sensing utility of a print apparatus. The method also can include detecting a magnitude of a difference between the measured color parameter intensity and reflectance spectral power distribution of the particular type of print medium and a predetermined intensity and reflectance spectral power distribution of the color parameter of the particular type of print medium, where the predetermined intensity and reflectance spectral power distribution is stored in memory.

20 Claims, 8 Drawing Sheets

| TYPE OF PRINT MEDIUM 410 | LIGHTNESS (L*) 420 | | L* VARIABILITY 450 | |
|---|---|---|---|---|
| | NOMINAL 430 | MEASURED 440 | NOMINAL 460 | MEASURED SCAN AXIS 470 |
| (1) HP PROFESSIONAL MATTE CANVAS | 97 | 96.86 | 1.50 | 0.187 |
| (2) HP PROFESSIONAL SEMI-GLOSS CONTRACT PROOFING PAPER | 96.8 | 94.21 | 1 | 0.148 |
| (3) HP PREMIUM INSTANT-DRY PHOTO SATIN | 95 | 94.06 | 1 | 0.105 |
| (4) HP PREMIUM INSTANT-DRY PHOTO GLOSS | 95 | 93.88 | 1 | 0.322 |
| (5) HP PROOFING MATTE | 95.3 | 92.92 | 0.4 | 0.326 |
| (N) HP UNIVERSAL INSTANT-DRY PHOTO GLOSS | 92.5 | 92.42 | 0.5 | 0.220 |

*Fig. 4*

COLOR SENSOR PERFORMANCE

CROSS REFERENCE TO RELATED APPLICATIONS

This Application claims the benefit of Provisional patent application Ser. No. 61/023,265, filed Jan. 24, 2008, titled "COLOR SENSOR PERFORMANCE" which application is incorporated by reference herein as if reproduced in full below.

INTRODUCTION

Color sensors may be calibrated at the factory and may call for recalibration during use by the customer to reduce inaccuracies in color measurements due to changes in performance of components associated with a color sensor. Such changes may, for instance, result from dirtying of the components of the color sensor with aerosol colorant coming, for instance, from ink droplets used for printing images. Recalibration of a color sensor to compensate for such changes may, for instance, include measuring color parameters of a known reference target (e.g., a ceramic white tile) and adjusting measurements made, using the components of the color sensor (e.g., light emitters and/or light capturing photodetectors) and/or compensating the measurements by applying signal processing, to correspond to saved color parameters of the known reference target.

However, despite attempts to protect the known reference target, the known reference target may, in some instances, also become dirtied with aerosol colorant resulting from printing of images, among other possible contributions to changes in measurement of color parameters of the known reference target. Hence, an assumption of an invariant reference target may be invalid because color parameters of the reference target may begin to change, in some instances, from the start of image printing by the print apparatus. As such, an ability of the print apparatus to maintain accuracy and/or consistency of color reproduction may be reduced over time, for instance, based upon a cumulative amount of colorant used.

BRIEF DESCRIPTION OF THE DRAWINGS

FIG. 4 illustrates determinations of color parameter intensities and variabilities for a number of types of print media according to embodiments of the present disclosure.

DETAILED DESCRIPTION

Figure 1:
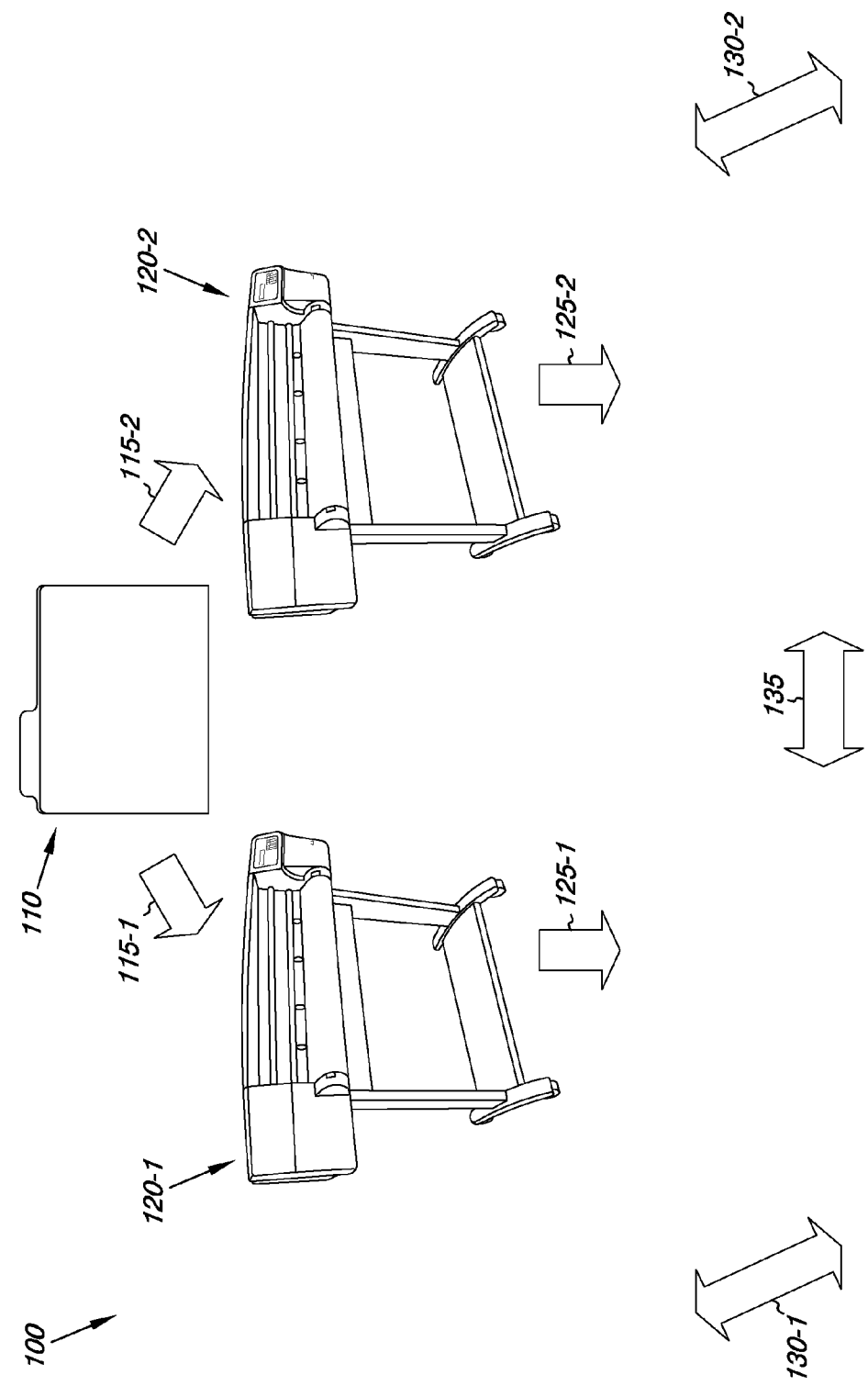
FIG. 1 illustrates an example of a printing system suitable for detecting and/or recalibrating color sensor performance according to embodiments of the present disclosure.

Reduced quality of color reproduction in images printed on one or more types of print media may be a complaint from customers (e.g., professional photographers, among others) to manufacturers and/or suppliers of print apparatuses and/or color sensors utilized therein. Some manufacturers have included components of a color sensing utility (e.g., a densitometer, colorimeter, and/or a spectrophotometer, along with one or more lenses and/or photodetectors associated therewith, among others) in the print apparatus that may, for instance, be used in recalibration of a print engine to improve accuracy and/or consistency of color reproduction. In addition, as discussed above, a color sensing utility may, in some instances, include a known reference target that is assumed to have constant color parameters (e.g., lightness, chroma, hue, and equivalents thereof in color imaging) on which recalibration of the color sensing utility and/or the print engine associated therewith may be based.

However, each of the color sensing utility components (e.g., light emitters, lenses, and photodetectors, among others) may become dirty, for instance, from aerosol colorant being deposited thereon associated with and/or resulting from printing of images by the print apparatus. Any of the components becoming dirty (among other causes of degradation during in-field use of the print apparatus and associated components) can reduce an ability of the combination of components of the color sensing utility from serving as a valid reference for recalibration of the print engine of the print apparatus in order to facilitate accuracy and/or consistency of color reproduction in images.

Such variability in color reproduction can reduce accuracy and/or consistency in color parameters in a printed image with respect to an input image (e.g., an image as seen on a monitor of a computer and/or a digital camera, and/or appearance of an image prior to scanning, among input from other image sources). Such variability in color reproduction also can reduce accuracy and/or consistency in color parameters in a printed image with respect to images obtained from a single print apparatus at different points in time, and/or with respect to images originating from the same input source and printed by two or more different print apparatuses, in some instances.

Decreased accuracy and/or consistency in color parameters in one or more printed images may be perceived by a customer as unacceptable image quality. Among the various ways of attempting to improve such a situation, a customer can, for example, arrange for a visit by service personnel to determine a cause for such reduced accuracy and/or consistency and/or install one or more densitometers, calorimeters, and/or spectrophotometers, lenses, photodetectors, among other color sensing utility components, and/or perform cleaning thereof. However, performing such activities can be expensive and/or time consuming and can, in some situations, delay printing of images beyond a desired time frame.

Embodiments of the present disclosure describe determining whether a color sensor is performing as intended relative to printing a number of images on a particular print medium intended by the customer for use in printing. Such a determination can be performed, for example, instead of, or in addition to, determining the condition of light emitters, lenses, photodetectors, and/or reference targets, among other components, prior to possible replacement thereof. In certain situations, determining and/or eliminating a number of probable causes of reduced accuracy and/or consistency related to color sensing utility performance can simplify improvement of such performance, thereby reducing time and/or cost devoted thereto.

Accordingly, among various embodiments of the present disclosure, determining performance of a color sensor, and/or components associated therewith, can be performed by measuring a color parameter intensity and/or reflectance spectral power distribution of a particular type of print medium with a color sensing utility of a print apparatus. Various embodiments can detect a magnitude of a difference between the measured color parameter intensity and/or reflectance spectral power distribution of the particular type of print medium and a predetermined intensity of the color parameter and/or reflectance spectral power distribution of the particular type of print medium, where the predetermined intensity and/or reflectance spectral power distribution is stored in memory. In some embodiments, the color sensing utility, and/or a print engine associated therewith, can be recalibrated based upon detecting the magnitude of the difference between the measured color parameter intensity and/or reflectance spectral power distribution and the predetermined color parameter intensity and/or reflectance spectral power distribution of the particular type of print medium.

FIG. 1 illustrates an example of a printing system suitable for detecting and/or recalibrating color sensor performance according to embodiments of the present disclosure. As one of ordinary skill in the relevant art will appreciate, embodiments of the present disclosure are not limited to inclusion with or implementation on a printing system using print apparatuses as illustrated in FIG. 1.

FIG. 1 illustrates an embodiment of a printing system 100. In various embodiments, printing systems as described in the present disclosure can include one or more sources of image input data connected to one or more print apparatuses. In addition, print apparatuses as described in the present disclosure can operate as a stand alone device (e.g., a color copier) and/or can be used as a print apparatus in an imaging system including a number of large format print apparatuses 120-1, 120-2 as illustrated in FIG. 1. Other formats of print apparatuses also can be suitable for use with embodiments of the present disclosure, for example, a print apparatus for a personal computer, among others.

FIG. 1 illustrates an embodiment of the printing system 100 that can use nominal values stored in a color map, which can include one or more one-dimensional (1D), two-dimensional (2D), and/or three-dimensional (3D) look-up tables (LUTs), among other types, to print color images, including color characters, on a number of particular print media (e.g., various types of paper and/or transparent film, among others).

The printing system 100 can use image data coming from an input source 110 on which, for example, halftoning using available colorants to render pixels in a rasterized image can be or has been performed. Examples of input sources can include color copiers, color scanners, color digital cameras, images saved in memory of a number of computers and/or accessed from a website thereon, color multi-function-peripherals, and/or color multi-functional printers, among other sources of image input.

The printing system 100 illustrated in FIG. 1 can have memory coupled thereto, where executable instructions can, in various embodiments, be stored for execution by one or more logic components in association with one or more print engines and/or one or more color sensing utilities. Such memory can be located within each print apparatus included in the printing system and/or be associated therewith in a proximal or distal location. One example is memory having instructions for detecting a magnitude of a difference between a measured color parameter intensity (e.g., at a particular wavelength and/or range of wavelengths) and/or reflectance spectral power distribution (e.g., across a particular range of wavelengths) of a particular type of print medium and a predetermined intensity and/or reflectance spectral power distribution of the color parameter of the particular type of print medium, where the predetermined intensity and/or reflectance spectral power distribution is also stored in memory usable in association with a color sensing utility associated with a print engine.

Figure 5A:
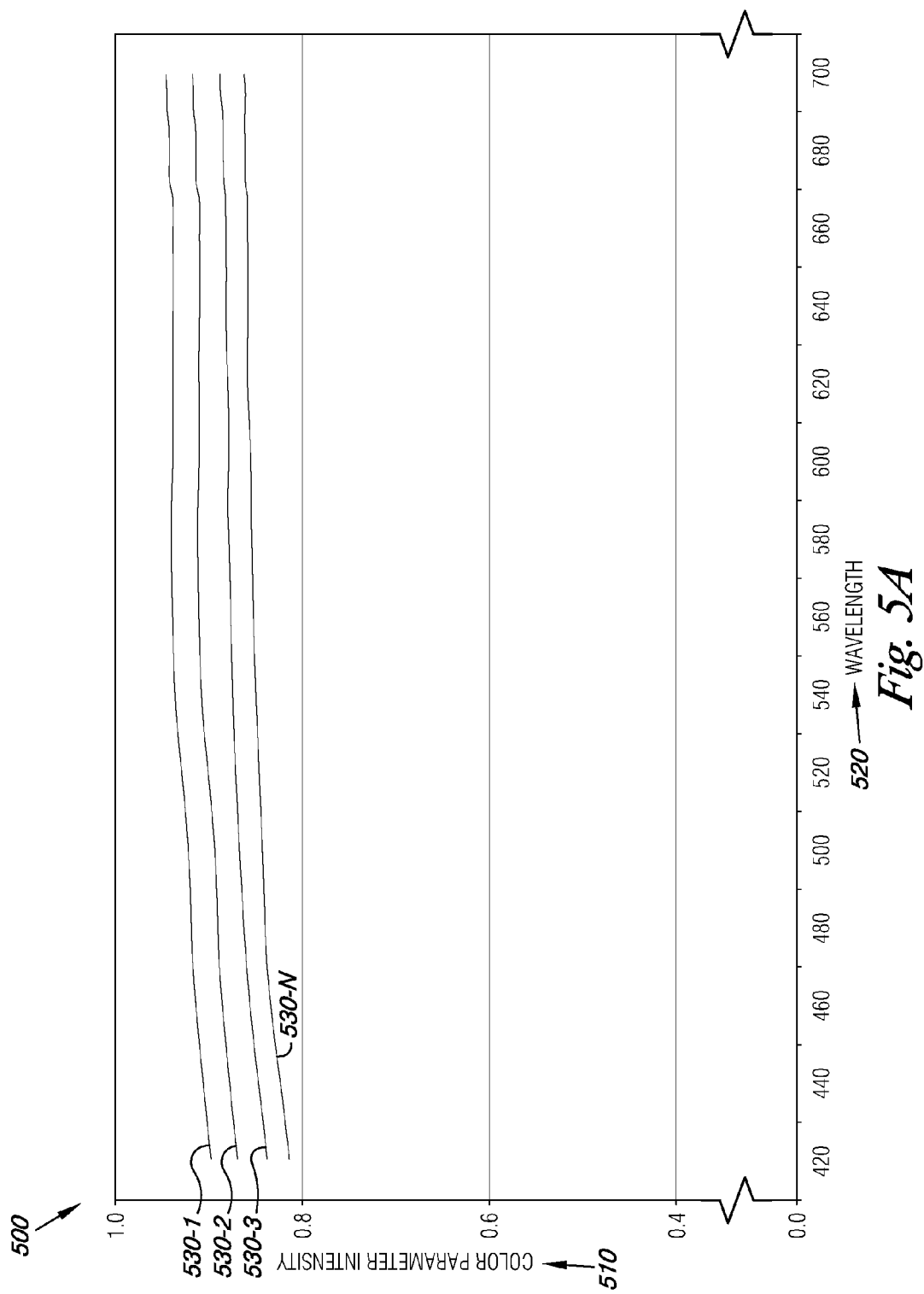
FIG. 5A illustrates an example of cumulative colorant usage affecting determinations of color parameter intensities and/or reflectance spectral power distributions.
Figure 5B:
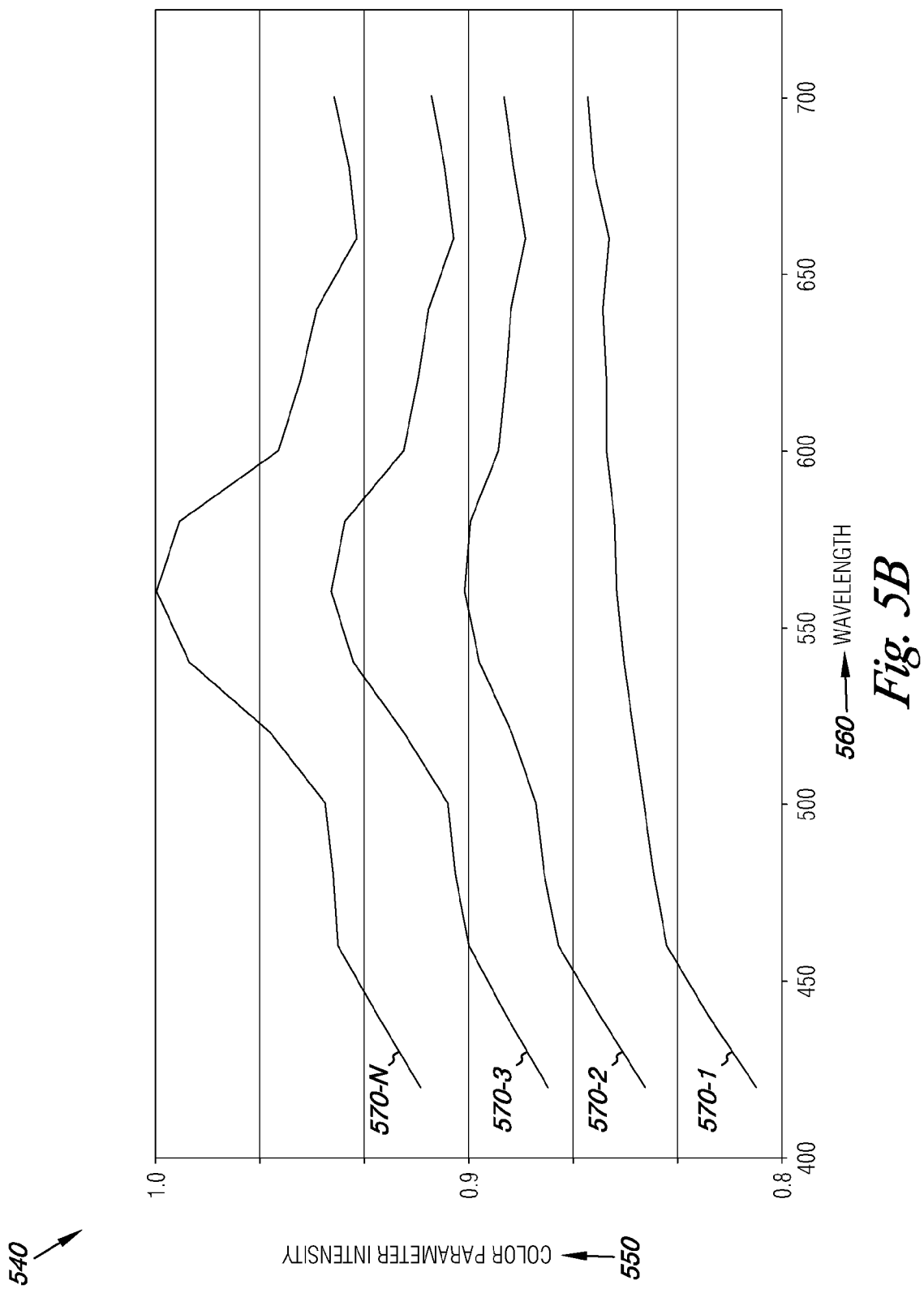
FIGS. 5B-5C illustrate examples of cumulative colorant usage affecting determinations of color parameter intensities and/or reflectance spectral power distributions according to embodiments of the present disclosure.
Figure 5C:
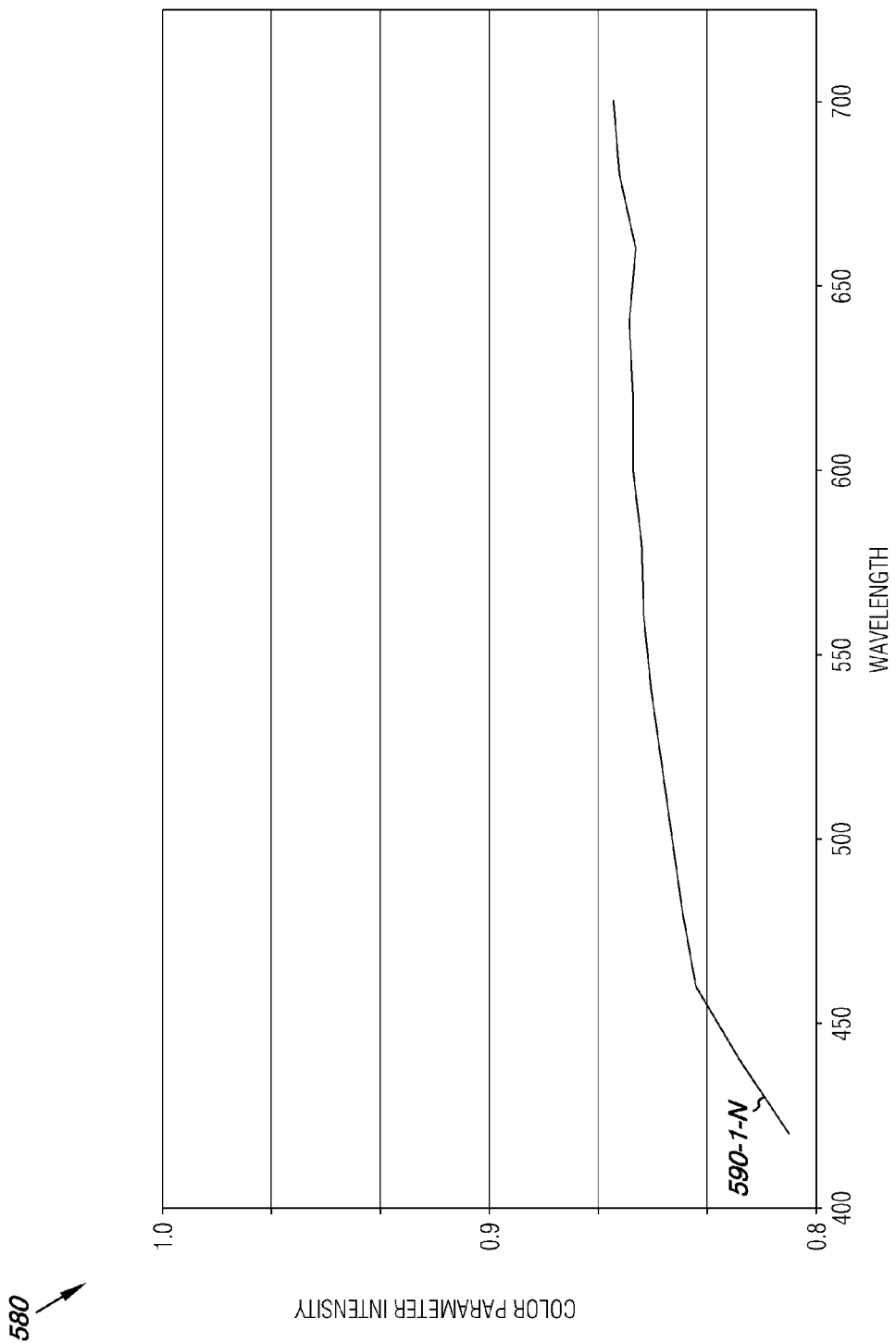

A spectral power distribution, as used in the present disclosure, can be described as light being measured and/or characterized by the power (e.g., intensity) of the light at each wavelength in a particular spectrum (e.g., a visible wavelength spectrum as illustrated in FIGS. 5A-5C). The resulting spectral power distribution may contain enough physical data about the light to allow quantitative analysis of color components therein.

The spectral power distribution may be measured by a color sensing utility containing, for instance, a spectrophotometer. Color parameters such as lightness $L^*$ and/or chroma of a particular color (e.g., hue) can be derived from the spectral power distribution to describe the particular color in a particular color space (e.g., the Commission Internationale d'Eclairage CIELAB $L^*a^*b^*$ color space).

An emittance spectral power distribution may characterize light emitted by particular sources (e.g., the sun, artificial lights, etc.). The power (e.g., intensity) of light emitted at each wavelength may be expressed as a proportion of the power of light emitted at the most luminous wavelength, as a proportion of the power of light emitted at an arbitrary standard wavelength, and/or as the power of light emitted proportional to an arbitrary reference power level. A transmittance spectral power distribution may characterize the power of light at each wavelength that passes through (i.e., is transmitted by) a particular medium as a proportion of the power of light incident on the opposite surface.

A reflectance spectral power distribution may characterize the power of light at each wavelength that is reflected by (i.e., not absorbed by and/or transmitted through) a surface as a proportion of the power of light incident on (i.e., illuminating) the surface. Because various types of print media can be used to provide surfaces for reflectance, the reflectance spectral power distribution may be used to measure and/or characterize characteristics of color parameters of the various types of print media themselves and/or color images printed thereon.

As used in the present disclosure, a control logic component can be or include software, firmware, and/or hardware for controlling and/or executing actions based upon data input (e.g., from one or more color sensors). Control logic can, for example, be used to compare measured data input with stored data in memory, among other functions. In some embodiments, a control logic component can utilize a clock signal to, for example, allow for comparison of measured data input with saved data input and/or coordination of control and/or execution based thereon with one or more different color sensing utilities and/or print engines.

A control logic component can, as used in the present disclosure, be a singular, indicating one control logic utility, and control logic components can be multiple, indicating control logic utilities, that is, more than one (i.e., a plurality of) control logic components. As described in the present disclosure, one or more control logic components, can, in some embodiments, be combined into a single application-specific integrated circuit (ASIC) or other unitary logic structures.

In various embodiments, the printing system 100 can include a number of inputs to receive instructions to be stored in the memory and/or a number of inputs for instructions that have been coded and/or stored, for example, on one or more preconfigured firmware units, among other sources. In various embodiments, a printing system as described in the present disclosure can receive source image data associated with pixels in alphanumeric character text, image, symbol documents, and/or documents having a combination of such elements. In addition, embodiments can receive source image data from various sources.

For instance, embodiments of printing systems as described in the present disclosure can receive source image data from a number of apparatus types 110 (e.g., a telecommunication apparatus, a telefaxing apparatus, a computing apparatus, a copying apparatus, and/or a scanning apparatus, among other sources of image input and/or memory) that can be connected to the embodiment of the printing system 100 illustrated in FIG. 1. In some embodiments, all of the just-mentioned functionalities can be included in an All-In-One (AIO) system having an associated (e.g., embedded) image processing apparatus that can contribute to performing the functions described herein.

Print apparatuses usable in printing systems included in the present disclosure can use various printing techniques. Such print apparatuses, for example, can print on a print medium by using techniques for applying a colorant onto the print medium, such as firing drops through nozzles of inkjet pens and/or by using color toner and a laser. Various embodiments of print apparatuses, including inkjet and/or laser printers, can print color images, including color characters, on a number of particular types of print media.

Print apparatuses as described in the present disclosure can also use a number of various colorants in printing. Print apparatuses can use, for example, three, four, six, or another number of colorants in various combinations in printing.

In various embodiments, a print apparatus as described in the present disclosure can use a number of colorants for printing on the number of particular types of print media that are formulated using one or more dyes, pigments, and combinations of each, among others. Such colorants can be combined, in various embodiments, for use in reactive ink systems and/or pigmented ink systems, among others.

By way of example and not by way of limitation, a print apparatus can, for example, use a number of colorants, such as Cyan, Magenta, and Yellow. In some embodiments, the C, M, and Y colorants (CMY) can be used along with additional colorants, for example, a black (K) colorant. In such embodiments, a print apparatus can print using colorants, such as CMYK, in which black and non-black colorants can be used in various combinations to produce composite image pixels displaying various shades of gray and/or any other colors available in a color map installed on the print apparatus. Some print apparatus embodiments can print using non-black colorants, such as CMY, in which such non-black colorants can be combined to produce black and/or shades of gray, including a neutral balanced gray, among other colors, in a printed color image.

FIG. 1 illustrates, by way of example and not by way of limitation, an embodiment of a printing system 100 suitable for use with various embodiments of the present disclosure in which the print apparatuses are large format print apparatuses 120-1, 120-2. In various embodiments, a printing system as described in the present disclosure can include an unlimited number of print apparatuses, for example, one, two, three, or more print apparatuses.

In some implementations, the large format print apparatuses 120-1, 120-2, as illustrated in FIG. 1, can be utilized by professionals and/or commercially for printing large maps, posters, advertisements, artwork, and/or signs, among other uses. Other formats of print apparatuses also can be suitable for use with embodiments of the present disclosure, for example, a print apparatus for a personal computer, among others.

In the embodiment illustrated in FIG. 1, the large format print apparatuses 120-1, 120-2 can include a chassis that houses and/or supports operative, decorative, and/or user interactive components, as will be appreciated by one of ordinary skill in the relevant art. Among the components that can be housed in and/or supported by the chassis are one or more print engines (not shown). The one or more print engines can include a number of components for printing images on a number of sheets of large format print medium 130-1, 130-2. In some situations, the images printed on the number of sheets of large format print medium 130-1, 130-2 by separate print apparatuses 120-1, 120-2, respectively, can be intended to represent duplicate images that have accuracy and/or consistency with respect to each other and/or with respect to the source of the image data 110.

Components of the one or more print engines can include and/or be associated with, among others, printheads having nozzles for applying colorant to, and printing on, the large format print media 130-1, 130-2 and a system (not shown) for recalibrating the performance of the printheads and/or nozzles thereof for such printing in order to maintain accuracy and/or consistency of the color reproduction achieved through use of the printheads and nozzles thereof. In various embodiments, the system for recalibrating can include a color sensing utility (e.g., a color sensing utility positioned within or otherwise associated with each print apparatus) having, for example, a number of light emitters, a number of lenses, and/or a number of photodetectors, among other components, to contribute to detecting and/or measuring a number of color parameter intensities and/or reflectance spectral power distributions evidenced by known reference targets and/or particular types of print media, as described in the present disclosure.

The print apparatuses (e.g., large format print apparatuses 120-1, 120-2) described in the present disclosure can have one or more data input mechanisms (e.g., for input of image data 115-1, 115-2 from a source 110). Among various embodiments, the one or more data input mechanisms can include one or more input keys, one or more memory media slots, one or more receivers for electromagnetic transmission, and/or one or more data ports.

The print apparatuses (e.g., large format print apparatuses 120-1, 120-2) can include one or more print media handling components for holding one or more pieces of various embodiments of particular types of print media (e.g., Hewlett-Packard (HP) professional matte canvas, HP professional semi-gloss contract proofing paper, HP premium instant-dry photo satin, among others from HP and/or other manufacturers) prior to input for printing thereon and/or after printing thereon. In addition, various embodiments of the print apparatuses described in the present disclosure can include a scanning/copying input and/or one or more display screen user interfaces.

Customers using, for example, one or more large format print apparatuses 120-1, 120-2, as illustrated in FIG. 1, may desire a way to determine performance of a color sensing utility on-site of each print apparatus, which in some embodiments of the present disclosure can contribute to recalibrating the respective print apparatus. Such a determination can, for example, contribute to increasing the accuracy and/or consistency of color parameter intensities and/or reflectance spectral power distributions of images included in output 125-1, 125-2 of the print apparatuses 120-1, 120-2, respectively.

That is, as described in the present disclosure, using one or more reference targets having known color parameter intensities and/or reflectance spectral power distributions that have not been stored for a period of time in an environment in which the reference targets may experience exposure to dirt and/or degradation (e.g., exposure of a white tile to aerosol colorant in an interior of a print apparatus, and exposure of printed color references to environmental conditions such as light, heat, humidity, and/or dust, among others) can improve consistency of recalibration of a single print apparatus relative to itself and/or improve consistency of calibration of multiple print apparatuses relative to each other.

As described in the present disclosure, accuracy and/or reliability of color reproduction can, in some embodiments, be improved by using a particular type of print medium having one or more known color parameter intensities and/or reflectance spectral power distributions (e.g., lightness) and saving such an intensity and/or reflectance spectral power distribution in memory. When using that particular type of print medium in the future, the color sensing utility can make a measurement of the one or more color parameter intensities and/or reflectance spectral power distributions of the particular type of print medium. Around that point in time, the logic component can, in various embodiments, compare the new measurement of the one or more intensities and/or reflectance spectral power distributions with the saved intensities and/or reflectance spectral power distributions of the one or more color parameters in order to determine whether one or more differences between the intensities and/or reflectance spectral power distributions reaches a threshold.

When such a threshold has been reached in a particular print apparatus, the corresponding color sensing utility and/or print engine can be recalibrated to reduce the difference in the one or more color parameter intensities and/or reflectance spectral power distributions as measured by the color sensing utility. Relative lightness intensity values (e.g., $L^*$) can, in some embodiments, be used to detect and measure difference levels (e.g., using the reflectance spectral power distribution, as described in the present disclosure) between a measurement of the particular type of print medium and a saved reference value for the particular type of print medium.

In various embodiments, the saved reference value for $L^*$ can come from measurement of, for instance, a particular type of paper to be printed upon, a ceramic tile, and/or other material having a satisfactorily uniform "wide and flat" reflectance power spectral distribution (e.g., as associated with "white color"). Such saved reference $L^*$ values can, in some embodiments, be used for recalibrating measurements of any color, for instance, by applying different weights to the different spectral bands.

An example of how to determine a threshold can be applied to the listing 400 of types of print media 410 illustrated in FIG. 4. A lightness value ($L^*$) 420 of a particular print medium (e.g., print medium types (1) through (N)) can be represented as an $L^*$ nominal value 430 and/or an $L^*$ measured value 440.

As described in the present disclosure, an $L^*$ nominal value can represent a lightness intensity value (e.g., from 0 to 100) provided by, for instance, a manufacturer of the particular print medium to users and potential users of the particular print medium. An $L^*$ measured value, in contrast, can represent a lightness intensity value as measured (e.g., with a reference color sensing utility) by the users and potential users of the particular print medium, for instance, to test accuracy of the $L^*$ nominal value provided by the manufacturer.

A threshold in variance from the $L^*$ nominal value and/or $L^*$ measured value can be obtained for determining whether to recalibrate the color sensing utility and/or print engine of a print apparatus, as described in the present disclosure, utilizing one or more determinations of $L^*$ variability (e.g., as shown at 450 in FIG. 4). For instance, a threshold in variance can be obtained using some multiple (e.g., an integer, decimal, fraction, etc.) of an $L^*$ variability nominal (e.g., as shown in column 460) provided by the manufacturer. The $L^*$ variability nominal may, in some instances, represent a $\pm/-$ variability value that the manufacturer offers as being indicative as a range of variance from the $L^*$ nominal value that can be measured in any sample of the particular type of print medium (e.g., as obtainable in the marketplace).

In some embodiments, a threshold in variance can be obtained using an $L^*$ variability as measured along a scan axis (e.g., as shown in column 470) of the particular print medium. In some instances, the $L^*$ variability as measured along the scan axis can, in various embodiments, be a variance in the $L^*$ measured values as determined (e.g., with a reference color sensing utility) along a scan axis (e.g., a partial or total width of the particular print medium, among other distances and/or directions). Such variability in $L^*$ measurements may result from paper white point variability, sensor to print medium variability, and/or cockle of the surface of the print medium, among other causes.

As such, in some embodiments of the present disclosure, a threshold can be determined to be applied to each particular type of print medium (e.g., the listing 400 of types of print media 410 illustrated in FIG. 4) by, in various embodiments, combining the $L^*$ variability nominal (e.g., as shown in column 460) and the $L^*$ variability as measured along a scan axis (e.g., as shown in column 470) of the particular print medium. For example, the $L^*$ variability nominal value and the $L^*$ variability as measured along the scan axis value for a particular print medium can, in some embodiments, be added together to determine a threshold value.

Such a threshold value, or multiples thereof, may be used with regard to the particular print medium to determine that performance of a color sensing utility in an in-service print apparatus has been affected (e.g., by deposition of aerosol colorant). Further, such a threshold value, or multiples thereof, may be used to determine that recalibration of the color sensing utility and/or associated print engine is warranted.

For example, as illustrated in FIG. 1, the accuracy and/or consistency of print output 125-1 coming from a single print apparatus 120-1 can be improved with regard to a series of images 130-1 printed at a number of points in a time line. Similarly, the accuracy and/or consistency of print outputs (e.g., as shown at 125-2) coming from one or more different print apparatuses (e.g., as shown at 120-2) also can be improved with regard to their respective series of images (e.g., as shown at 130-2) printed at a number of points in a time line.

In addition, by measuring color parameter intensities and/or reflectance spectral power distributions of a particular type of print medium, comparing such intensities and/or reflectance spectral power distributions to values for the particular type of print medium stored in memory, and recalibrating the respective color sensing utilities and/or print engines when appropriate, accuracy and/or consistency of color reproduction can be improved for multiple print apparatuses using the particular type of print medium for printing thereon. For example, as illustrated in FIG. 1, the accuracy and/or consistency of print output 125-1, 125-2 of individual or multiple images 130-1, 130-2 coming from the two print apparatuses 120-1, 120-2, respectively, can be improved relative to each other 135.

Figure 2:
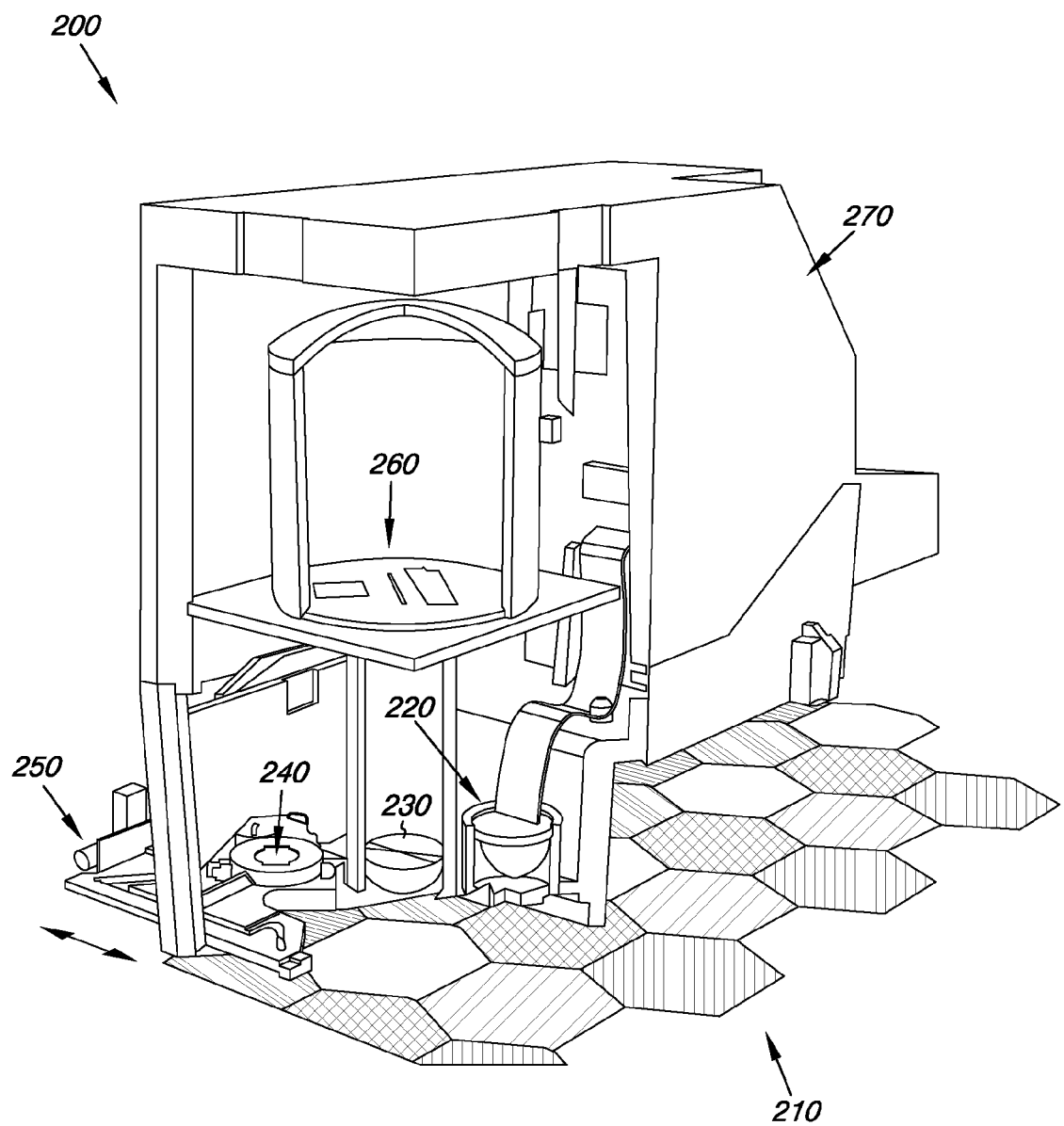
FIG. 2 illustrates an example of a prior art color sensing utility.

FIG. 2 illustrates an example of a prior art color sensing utility. FIG. 2 shows a combination of components illustrative of color sensing as used in prior implementations. Using such color sensing may, however, in some instances, result in error in recalibration of a color sensing utility and/or print engine of a print apparatus.

FIG. 2 illustrates an instance of a color sensing utility 200 in which the color sensing utility 200 has a number of components. Particular implementations, however, may utilize more or less components and/or different components than those components shown in FIG. 2.

In some instances, a color sensing utility 200 may use a color verification target 210, such as shown in FIG. 2. Color verification targets may display one or more color patches having predetermined and defined color parameter intensities and/or reflectance spectral power distributions usable in calibration of a print engine of a print apparatus.

FIG. 2 illustrates the color verification target 210 as having a number of hexagonal patches displaying a number of predefined color samples within the hexagons; however, the color verification target 210 shown in FIG. 2 is representative of color verification targets configured in various manners. Color verification targets may, for instance, be externally printed by a supplier of a particular color sensing utility and/or by an independent supplier.

Color verification targets may, for instance, be supplied along with the print apparatus that includes the color sensing utility and/or be supplied to a customer upon request (e.g., when experiencing inaccuracy and/or inconsistency in color reproduction). The supplied color verification targets may have predetermined and defined color parameter intensities and/or reflectance spectral power distributions (e.g., in one or more color patches thereon) usable by the color sensing utility for determining performance of color sensor components and/or for recalibrating the color sensing utility and/or the associated print engine.

The color sensing utility 200 illustrated in FIG. 2 is shown to include a light emitting component 220. In various instances, as described in prior disclosures and used in prior implementations, the light emitting component 220 may, for instance, be one or more light bulbs, lasers, and/or light emitting diodes (LEDs), among other possible light emitting components.

Such light emitting components may, for instance, be part of a densitometer, a calorimeter, and/or a spectrophotometer component serving to illuminate a color verification target, such as the color verification target 210 illustrated in FIG. 2. Among the various implementations, the light emitting component 220 may emit substantially white light and/or one or more colors of light for illuminating the color verification target 210.

The color sensing utility 200 also is shown to include a lens component 230 for focusing light emitted from the light emitting component 220 and/or reflected by the color verification target 210 to enable detection thereof by a photodetector component 260. The lens component 230 and/or the photodetector component 260 may, in various implementations, include one or more lenses and/or one or more photodetectors associated therewith, among other possible components.

The color sensing utility 200 may, in some instances, include a known reference target 240 (e.g., a ceramic white tile) positioned in association with the color sensing utility 200. In various implementations, one or more known reference targets may be selected based on predetermined and defined color parameter intensities and/or reflectance spectral power distributions usable in calibration of a print engine of a print apparatus.

The known reference target 240 may, in some instances, be used in addition to or instead of the color verification target 210 to reflect light emitted by the light emitting component 220 and focused by the lens component 230 to enable detection thereof by the photodetector component 260. A color verification target may, in some instances, be storable external to a color sensing utility and be presented to the color sensing utility by a customer and/or service technician for assessing performance of the color sensing utility and/or recalibrating the color sensing utility and/or the print engine associated therewith.

In contrast, in some instances, one or more known reference targets, as illustrated by the known reference target 240 shown in FIG. 2, may be associated with the color sensing utility and positioned internally inside the print apparatus. As illustrated in FIG. 2, the known reference target 240 may be positioned on a movable carriage 250 that allows presentation of the known reference target 240 to the light emitting component 220 at appropriate times to reflect light emitted by the light emitting component 220, which can be focused by the lens component 230 to enable detection thereof by the photodetector component 260.

The color sensing utility 200 illustrated in FIG. 2 is shown to include a housing for electronics components 270. In various instances, the housing for electronics components 270 may, for instance, include software and/or circuitry that enables measurement of color parameter intensities and/or reflectance spectral power distributions sensed using, for instance, the light emitting component 220, the lens component 230, and/or the photodetector component 260. The housing for electronics components 270 may, in various instances, include and/or be associated with one or more elements of memory and/or the print engine to enable assessing performance of the color sensing utility 200 and/or recalibrating the color sensing utility 200 and/or the print engine associated therewith.

Using color verification targets and/or known reference targets for determining performance of a color sensor and/or recalibrating a print engine associated therewith, as illustrated in FIG. 2, may entail potential drawbacks. Preprinted color verification targets may have physical characteristics that vary with elapsed time since the color verification targets were printed and/or had their color parameter intensities and/or reflectance spectral power distributions determined and defined for later use.

A variance in physical characteristics may be, for instance, due to exposure of the color verification target to environmental conditions such as light, heat, humidity, and/or dust, among others. The color verification targets may become at least intermittently exposed to such environmental conditions even when primarily stored in a protected enclosure. For instance, a color verification target can be exposed to such environmental conditions when being used for determining performance of a color sensor and/or recalibrating the color sensing utility and/or a print engine associated therewith, in addition to other situations.

Color verification targets may, for instance, be externally printed by a supplier of a particular color sensing utility and/or by an independent supplier. Color verification targets may, for instance, be supplied along with the print apparatus that includes the color sensing utility and/or be supplied to a customer upon request (e.g., when experiencing inaccuracy and/or inconsistency in color reproduction). The supplied color verification targets may have predetermined and defined color parameter intensities and/or reflectance spectral power distributions (e.g., in one or more color patches thereon) usable by a color sensing utility for determining performance of color sensor components and/or for recalibrating the color sensing utility and/or the associated print engine.

In some situations, color verification targets can be expensive for a supplier, for instance, to print, determine and/or define color parameter intensities and/or reflectance spectral power distributions thereon, and/or to send to customers. Hence, in such instances, color verification targets may only be sent to customers upon request and/or after purchase thereof. As such, a customer may not have a suitable color verification target on-site for determining performance of a color sensing utility and/or recalibrating the color sensing utility and/or the print engine associated therewith for reasons including a desire by the customer to reduce expenses, a time interval between request of the suitable color verification target and receipt thereof, among other reasons. Other possible drawbacks to using preprinted color verification targets may, for instance, include: customers may make a mistake when using the color verification target (e.g., exposure to detrimental environmental conditions); the print apparatus may have difficulties with properly loading a substrate (e.g., a card, a sheet of paper, a transparency, among others) upon which the color verification target is printed; some customers may not trust the accuracy of the provided predetermined and defined color parameter intensities and/or reflectance spectral power distributions because some customers do not have, for instance, an external spectrophotometer with which to verify the predetermined and defined color parameter intensities and/or reflectance spectral power distributions.

Known reference targets (e.g., a ceramic white tile), as described in the present disclosure and illustrated in FIG. 2, may be positioned in association with a color sensing utility in a print apparatus by a manufacturer and/or a customer using the color sensing utility. As described with regard to color verification targets, known reference targets also may have physical characteristics that vary with elapsed time since the color verification targets were printed and/or had their color parameter intensities and/or reflectance spectral power distributions determined and defined for later use.

For instance, as with the color verification targets, the variance in physical characteristics may, for instance, be due to exposure of the known reference targets to environmental conditions such as light, heat, humidity, and/or dust, among others. Because, in some instances, the one or more known reference targets may be positioned within an enclosure of a print apparatus, the known reference targets may additionally be dirtied with aerosol colorant coming, for instance, from ejection of colorant droplets during print operations.

In some instances, the known reference targets may become dirtied with aerosol colorant even when retracted to a protected position, for instance, when using the movable carriage 250 illustrated in FIG. 2. In addition, known reference targets may be exposed to levels of and/or variations in conditions (e.g., heat, humidity, etc.) beyond what may be encountered in the outside environment.

Similar to color verification targets, in some situations, known reference targets can be expensive for a supplier, for instance, to construct, determine and/or define color parameter intensities and/or reflectance spectral power distributions thereof, install in association with the color sensing utility, and/or to send to customers. Hence, known reference targets may, for instance, be an option only provided to customers of color sensing utilities and/or print apparatuses upon request and/or after purchase thereof.

As such, a customer may decide to forego the expense of a known reference target and/or may not have a suitable known reference target on-site for promptly determining performance of a color sensor and/or recalibrating the color sensing utility and/or the print engine associated therewith. Another possible drawback to using one or more known reference targets may, for instance, include changes in the dimensions (e.g., height, width, weight) of a print apparatus containing the known reference targets relative to, for instance, the customer's desired dimensions and/or available space.

Figure 3:
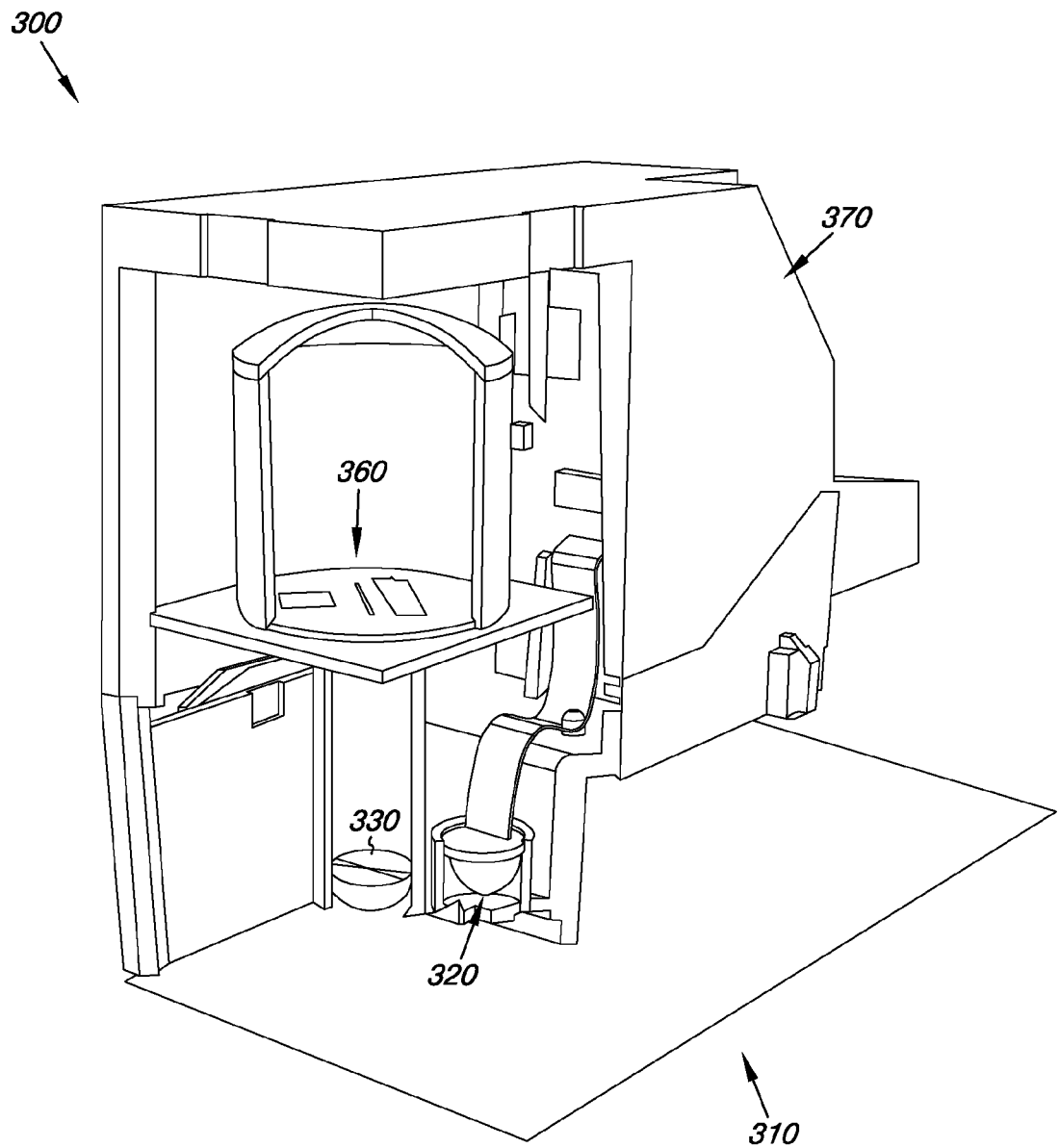
FIG. 3 illustrates an embodiment of a color sensing utility according to embodiments of the present disclosure.

FIG. 3 illustrates an embodiment of a color sensing utility according to embodiments of the present disclosure. FIG. 3 shows a combination of components illustrative of color sensing as described in the present disclosure.

FIG. 3 illustrates an embodiment of a color sensing utility 300 in which the color sensing utility 300 has a number of components as described in the present disclosure, for example, with regard to FIG. 2. As illustrated in FIG. 3, however, the embodiment shown may utilize fewer components and/or less complex components than those components shown in FIG. 2.

In various embodiments, the color sensing utility 300 as described in the present disclosure can use a plain sheet, in some embodiments, of a particular type of print medium 310, for example, instead of a preprinted color verification target 210, as illustrated in FIG. 2. As illustrated in, and further described with regard to, FIG. 4 and as discussed above, the particular types of print media can be selected for reasons based upon particular qualities appropriate for particular types of images to be printed thereon, a desired impression to be made upon a viewer by the particular qualities, and/or the particular qualities appropriate to a function to be served by the image printed upon the particular type of print medium (e.g., to be included in a high quality art book, to serve as a transparency in presentations, etc.), among other reasons.

As shown with the color sensing utility 200 illustrated in FIG. 2, the color sensing utility 300 illustrated in FIG. 3 is shown to include a light emitting component 320, which can, in various embodiments of the present disclosure, be one or more light bulbs, lasers, and/or LEDs, among other possible light emitting components. Such light emitting components may, in various embodiments, be part of a densitometer, a calorimeter, and/or a spectrophotometer component serving to illuminate a particular type of print medium, such as the single sheet of the particular type of print medium 310 illustrated in FIG. 3. In various embodiments, the light emitting component 320 can emit substantially white light and/or one or more otherwise defined colors of light for illuminating the particular type of print medium 310.

The color sensing utility 300 can, in some embodiments, include a lens component 330 for focusing light emitted from the light emitting component 320 and reflected by the particular type of print medium 310 to enable detection thereof by a photodetector component 360. The lens component 330 and/or the photodetector component 360 can, in various embodiments, include one or more lenses and/or one or more photodetectors associated therewith, among other possible components.

In contrast to the color sensing utility 200 illustrated in FIG. 2, color sensing utilities as described in the present disclosure and illustrated in FIG. 3 can, in various embodiments, operate without using a color verification target and/or a known reference target, as such are described with regard to FIG. 2. That is, as described in embodiments of the present disclosure, a particular type of print medium, as represented by a single sheet 310 in FIG. 3, can serve as a reference target having predetermined and/or defined color parameter intensities and/or reflectance spectral power distributions (e.g., saved in memory) usable in calibration of the color sensing utility and/or the print engine of a print apparatus.

Customers can have supplies of particular types of print media on-site intended for printing of images thereon, which have not been exposed to environmental conditions that affect the color parameters thereof (e.g., aerosol colorant contained in the interior of a print apparatus). The color sensing utility and/or the print engine, in some embodiments, may call for recalibration, however, when components such as the light emitting component, the lens component, and/or the photodetector component, among others, have their functionality affected by, for example, exposure to aerosol colorant. As illustrated in FIG. 5, exposure of components of a color sensing utility to aerosol colorant can have a cumulative increase in effect on measurements of color parameter intensity and/or reflectance spectral power distribution that corresponds to a number of print operations performed.

Measuring one or more color parameter intensities and/or reflectance spectral power distributions, in various embodiments, of a particular type of print medium around the time of intended printing thereon and comparing the measurements to previously saved color parameter intensities and/or reflectance spectral power distributions for the same particular type of print medium can assist in determining the performance of a combination of color sensor components. In some embodiments, the print apparatus manufacturer and/or the print media manufacturer can test the print media and provide thresholds and/or standards for various print media qualities (e.g., color parameter intensities and/or reflectance spectral power distributions) that may be useful in such calibration and/or recalibration processes.

In some embodiments, recalibrating the color sensing utility and/or the print engine associated therewith can be based upon detecting a magnitude of a difference between the measured color parameter intensity and/or reflectance spectral power distribution and the predetermined (e.g., as provided by hardware, firmware, software, and/or a measurement performed when the particular print medium and/or reference target was first loaded) color parameter intensity and/or reflectance spectral power distribution of the particular type of print medium. As such, one or more particular types of print media 310 can, in various embodiments, be used in addition to or instead of the color verification target and/or the known reference target to reflect light emitted by the light emitting component 320 and focused by the lens component 330 to enable detection thereof by the photodetector component 360, as illustrated in FIG. 3.

The color sensing utility 300 illustrated in FIG. 3 can include a housing for electronics components 370. In various embodiments, the housing for electronics components 370 can, for instance, include software and/or circuitry that enable measurement of color parameter intensities and/or reflectance spectral power distributions of the particular type of print medium 310 sensed using, for example, the light emitting component 320, the lens component 330, and/or the photodetector component 360. The housing for electronics components 370 can, in various embodiments, include and/or be associated with one or more elements of memory and/or a print engine that enable assessing performance of the color sensing utility 300 and/or recalibrating the color sensing utility and/or the print engine associated therewith.

In some embodiments, the housing for electronics components 370 can, in various embodiments, include and/or be associated with one or more elements of a control logic component for accessing measurements made by components of the color sensing utility and/or stored in the memory, interpreting such measurements, and/or directing performance of actions (e.g., recalibration) based thereon, among other functions. As such, as described in the present disclosure, the control logic component can be or include software, firmware, and/or hardware for controlling and/or executing actions based upon data input (e.g., from one or more color sensing utilities).

As discussed above, in some embodiments, a control logic component can utilize a clock signal to, for example, allow for comparison of measured data input with saved data input and/or coordination of control and/or execution based thereon with one or more different color sensing utilities and/or print engines.

A print apparatus that, as described in the present disclosure, is capable of calibrating color sensor performance can utilize a color sensing utility. The color sensing utility can, in various embodiments, include a light source (i.e., a light emitting component) to illuminate a particular type of print medium upon which an image is to be printed, a photodetector to detect a spectrum of colors reflected by the particular type of print medium, memory to save results of a number of color parameter intensities and/or reflectance spectral power distributions detected throughout the spectrum of colors, and a logic component.

The logic component, in various embodiments, can be utilized to, among other functions: measure the intensity of the number of color parameters of the particular type of print medium; detect a magnitude of a difference between a measured color parameter intensity of the particular type of print medium and a predetermined intensity of the color parameter of the particular type of print medium; and/or recalibrate the color sensing utility based upon detecting the magnitude of the difference between the measured color parameter intensity and the predetermined intensity of the color parameter of the particular type of print medium.

In some embodiments, the light source can be utilized to illuminate a particular type of print medium that is substantially white, where the photodetector can detect the lightness intensity thereof, and the memory can save a number of lightness intensity results of the particular type of substantially white print medium. The predetermined intensity of the color parameter can, in some embodiments, be a predetermined lightness intensity of a number of particular types of substantially white print media input into the memory by a supplier of the color sensing utility. In addition and/or alternatively, the predetermined intensity of the color parameter can, in some embodiments, be a lightness intensity being measured and/or input into the memory around a time when a user first intends to print an image on the particular type of substantially white print media.

FIG. 4 illustrates determinations of color parameter intensities and variabilities for a number of types of print media according to embodiments of the present disclosure. By way of example and not by way of limitation, FIG. 4 illustrates a listing 400 that documents a number of different types of print media. For purposes of illustration, the listing 400 includes a variety of types of substantially white print media supplied by Hewlett-Packard. However, the teachings of the present disclosure are intended to cover a broad range of types of print media, for example, print media that have a broad range of colors other than substantially white, print media that have a broad range of textures and/or finishes, and/or print media coming from suppliers other than Hewlett-Packard, among other characteristics attributable to types of print media upon which images can be printed by a print apparatus.

The listing 400, in various embodiments, can include the identity of each particular type of print medium 410 and characteristics about each type of print medium provided, for example, by the supplier of the color sensing utility and/or as a result of a measurement made and recorded when the user first intends to print an image on the particular type of substantially white print media. The characteristics recorded in association with each particular type of print medium can, in various embodiments, include color parameter intensities attributable to the particular type of print medium, as provided by the supplier and/or as measured by the color sensing utility of the print apparatus.

For example, as illustrated in FIG. 4, such color parameter intensities can include the lightness 420 of a substantially white print medium. In various embodiments, as appreciated by one of ordinary skill in the relevant art, a lightness of the substantially white print medium can be measured in a color space such as the Commission Internationale d'Eclairage CIELAB L*a*b* color space, the International Color Consortium (ICC) L*a*b* color space, the Hunter Lab color space, among others, having an L* for lightness (or L for luminosity, among other equivalents) parameter along with color axes (e.g., a* and b*, a and b, among others).

In some embodiments, recording lightness 420 (e.g., L*) for a particular print medium can be subdivided, for example, into nominal L* 430 (e.g., as provided by the supplier of the particular type of print medium) and/or the L* of the particular type of print medium as measured 440 by the color sensing utility of the print apparatus (e.g., around the time when the user first intends to print an image on the particular type of substantially white print media). In some embodiments, the measured L* intensity 440 can be recorded as a mean L* intensity obtained from a number of measurements. In various embodiments, the listing of the provided 430 and/or measured 440 color parameter intensities characteristic of each particular type of print medium can be stored in a memory associated with the color sensing utility.

The listing 400 also can include, in various embodiments, variabilities in the color parameter intensities associated with each particular type of print medium. In some embodiments, as illustrated in FIG. 4, an L* variability 450 can be recorded, for example, for each type of substantially white print medium having a recorded L* intensity 420.

For example, recording of L* variability 450 can, in some embodiments, include a nominal L* variability 460 (e.g., as provided by a supplier as an intensity that can be added to or subtracted from the nominal L* intensity to encompass the range of intensities in a number of batches of the particular print medium). Recording of L* variability 450 also can include, in some embodiments, a variability in lightness of the particular type of print medium as determined by a number of measurements using the color sensing utility around the time when the user first intends to print an image, for example, on the particular type of substantially white print media.

In some embodiments, the variability as measured can be recorded as a measured scan axis variability 470. For example, a range of measurements contributing to the measured L* intensity 440 (e.g., the mean of the range of measurements) as recorded on a scan axis (e.g., along a horizontal width of the particular type of print medium) can, in some embodiments, be considered the L* variability 450 along the measured scan axis 470 for the measured L* intensity 440.

In various embodiments, the listing of the provided 460 and/or measured 470 L* variabilities characteristic of each particular type of print medium can be stored in a memory associated with the color sensing utility. Such recorded variabilities can, in various embodiments, be used for determining whether a magnitude of a difference between a subsequently measured color parameter intensity reaches or exceeds the recorded variability of the particular print medium, as described above. In some embodiments, reaching or exceeding the recorded variability can be considered a threshold that can be used for determining the performance of the color sensing utility. In some embodiments, reaching or exceeding the threshold can initiate recalibration of the color sensing utility and/or the print engine associated therewith.

As illustrated in FIG. 4, the types of print media 410 numbered 1 through N can represent an unlimited number of types of print media recorded along with associated characteristics in memory associated with a color sensing utility. For example, a HP Professional Matte Canvas print medium designated as (1) under type of print medium 410 can have recorded in memory a nominal L* intensity 430 of 97 on a scale of 0 through 100 and/or a measured L* intensity 440 of 98.86.

The particular types of print media also can have recorded in memory a nominal L* variability 460 and/or a measured scan axis L* variability 470, as such variabilities are described above in the present disclosure, among other possible determinations of variability in color parameter intensities. For example, the HP Professional Matte Canvas print medium designated as (1) can have a nominal L* variability 460 of 1.50 on the scale of 0 through 100 and/or a measured scan axis L* variability of 0.187.

As illustrated in the listing 400 shown in FIG. 4, various substantially white print media can have notably different L* intensities and/or L* variabilities. For example, the HP Professional Matte Canvas print medium designated as (1) can have recorded in memory a nominal L* intensity 430 of 97 on a scale of 0 through 100, a measured L* intensity 440 of 96.86, a nominal L* variability 460 of 1.50, and/or a measured scan axis L* variability 470 of 0.187, among other possible determinations of variability in color parameter intensities. In contrast, an HP Universal Instant—Dry Photo Gloss print medium designated as (N) can have recorded in memory a nominal L* intensity 430 of 92.5 on a scale of 0 through 100, a measured L* intensity 440 of 92.42, a nominal L* variability 460 of 0.5, and/or a measured scan axis L* variability 470 of 0.220, among other possible determinations of variability in color parameter intensities.

Hence, each particular type of print medium can have notably different color parameter intensities and variabilities, as illustrated by comparison of recorded values for the particular types of print media numbered 1 through N in FIG. 4. As such, subsequently measured color parameter intensities of a particular type of print medium can be compared with previously determined intensity measurements of the same type of print medium to appropriately determine performance of components of color sensing utilities and/or contribute to recalibration of the color sensing utility and/or the print engine associated therewith.

FIG. 5A illustrates an example of cumulative colorant usage affecting determinations of color parameter intensities and/or reflectance spectral power distributions. FIG. 5A illustrates, by way of example and not by way of limitation, a graph 500 showing an effect on measured color parameter intensity 510 across a reflectance spectral power distribution caused by using colorant during execution of sequential print operations by a print apparatus.

The graph 500 shown in FIG. 5A illustrates an example of an effect of cumulative usage of colorant in a print apparatus on the measured color parameter intensity 510 and/or reflectance spectral power distribution as determined on a linear intensity scale. The intensity scale shown on the vertical axis can, in some embodiments, use a low of 0.0 to indicate a substantially lower value of measurable intensity of the measured color parameter and/or reflectance spectral power distribution and can use a high of 1.0 to indicate a substantially upper value of measurable intensity of the measured color parameter and/or reflectance spectral power distribution.

From such a spectral power distribution, a number of color parameters can be calculated (e.g., lightness, chroma, hue, among others).

The graph 500 shown in FIG. 5A illustrates the example of the effect of cumulative usage of colorant on the measured color parameter intensity 510 and/or reflectance spectral power distribution as determined across a wavelength spectrum 520. In some embodiments, a wavelength spectrum across which color parameter intensities and/or reflectance spectral power distributions are determined can substantially correspond to a wavelength spectrum perceivable by the human visual system (e.g., from around 400 nanometers (nm) to around 700 nm), as shown by the wavelength spectrum 520 illustrated on the horizontal axis of the graph 500 in FIG. 5A.

Various embodiments of the present disclosure, however, can be utilized as part of, and/or associated with, a variety of types of print apparatuses (e.g., inkjet, laser, among others) and/or number of such print apparatuses. Saved reference color parameter intensities and/or reflectance spectral power distributions, as described in the present disclosure, can, in various embodiments, be acquired from measurement of, for example, particular types of print medium and/or a known reference target (e.g., a ceramic tile) with reflectance spectral power distributions that essentially match those of a particular type of print medium. In addition, various embodiments of the present disclosure can measure and/or print color spectrum ranges differing from that illustrated in FIGS. 5A-5C.

Ejecting colorant from printheads, for example, during execution of print operations may contribute toward lowering sensitivity to light of color sensing utility components contained within a housing of the print apparatus. For example, ejection of colorant from each of the printheads may, in addition to forming droplets intended for image formation on a print medium, cause a portion of the ejected colorants to be consumed in formation of an aerosol mist of the colorants ejected by each of the printheads.

In some situations, such aerosol colorants may settle upon and/or obstruct (e.g., by dirtying) components of the color sensing utility (e.g., the one or more light emitting components, the one or more lenses, and/or the one or more photodetector components, among others). Dirtying such components of the color sensing utility may, in some situations, lower an intensity of light emitted (e.g., by the light emitting components), light focused for detection (e.g., by the lenses), and/or light detected (e.g., by the photodetector components), thereby lowering the sensitivity of the color sensing utility.

Aerosol colorant also may, in some situations, settle upon and dirty, for instance, a known reference target (e.g., a white ceramic tile) contained within the housing of the print apparatus. By doing so, the aerosol colorant may, in some instances, artifactually lower the color parameter intensities and/or reflectance spectral power distributions of the known reference target as measurable by the color sensing utility.

Artifactually lowering the sensitivity of the color sensing utility and/or the color parameter intensities and/or reflectance spectral power distributions of the known reference target, for instance, by dirtying with aerosol colorant may result in the color sensing utility and/or the print engine associated therewith comparing the resulting lowered color parameter intensities and/or reflectance spectral power distributions with saved reference color parameter intensities and/or reflectance spectral power distributions (e.g., of the known reference target). Such a comparison may, in some instance, cause recalibration of the color sensing utility and/or the print engine associated therewith by a component programmed to do so (e.g., a closed loop color (CLC) processing system, a raster image processing (RIP) system, and/or other algorithms).

Recalibration based upon such artifactual dirtying and lowering of measured color parameter intensities and/or reflectance spectral power distributions may, in some instances, cause increased amounts of colorant to be applied to images to inappropriately compensate for the artifactually lowered and measured color parameter intensities and/or reflectance spectral power distributions. As the cumulative amount of colorant used increases with sequential print operations performed, the dirtying of the components of the color sensing utility and/or the known reference target may correspondingly increase. As such, repetitive recalibrations of the color sensing utility and/or the print engine associated therewith may be performed.

As a result, unless a target not exposed to environmental conditions (e.g., the aerosol mist in the interior of a print apparatus) is used for measurement of color parameter intensities and/or reflectance spectral power distributions and comparison with saved reference measurements of the same target, or an equivalent sample thereof, is performed, as described in the present disclosure, progressively decreasing quality of printed images may be experienced by a customer. For example, color accuracy may be decreased by, for instance, applying more colorant to inappropriately increase color darkness (e.g., decrease lightness, and/or increase chroma, saturation, etc.).

Further, consistency of color reproduction may be decreased over time in the same image printed by the same print apparatus. In addition, consistency of color reproduction may be decreased over time in the same image file printed by different print apparatuses due to, for instance, each print apparatus using different cumulative amounts of colorant over time, thereby causing divergent amounts of aerosol colorant to dirty the components of the color sensing utility and/or the known reference target, which may cause divergent recalibrations of the color sensing utilities and/or print engines associated therewith in each print apparatus.

FIG. 5A shows a graph 500 that illustrates a representative example of cumulative usage of colorant in a print apparatus lowering the measured color parameter intensity 510, for example, as a result of dirtying the components of the color sensing utility and/or the known reference target. The color parameter intensity 510 shown in the graph 500 can, in some instances, represent measurements across a visible wavelength spectrum 520 of light reflected by a particular type of substantially white print medium. In such situations, the lightness across the visible wavelength spectrum 520 of the substantially white print medium may have relatively high intensities, as displayed in the graph 500 by sequential measurements overtime (e.g., lines 530-1 through 530-N) across the visible wavelength spectrum 520 having measurements between intensity values of 0.8 and 1.0, as shown on the color parameter intensity axis 510.

In the graph 500, the upper line 530-1 across the visible wavelength spectrum 520 can represent, in some embodiments of the present disclosure, measurements of lightness intensity and/or reflectance spectral power distribution of a particular type of substantially white print medium as measured around the time when the user first intends to print an image on the particular type of substantially white print media. In some embodiments, such lightness intensity and/or reflectance spectral power distribution measurements can be saved in memory to provide reference values with which later lightness intensity and/or reflectance spectral power distribution measurements of the same type of substantially white print medium can be compared.

The lines 530-2, 530-3, and 530-N in graph 500 are intended to represent lightness intensities measured at subsequent points in time (e.g., after a particular number of images has been printed between each measurement) during which a progressively increasing cumulative amount of colorant has been used. The lightness intensity, as discernable on the color parameter intensity axis 510, can have measurements across the reflectance spectral power distribution that progressively decrease, which, in some situations, may correspond to progressively increasing amounts of aerosol colorant settling on the color sensing utility components.

As illustrated in the graph 500, relative distances between each line across the visible wavelength spectrum 520 are substantially constant even though the lightness intensity at particular wavelengths, as measured on the color parameter intensity axis 510, can vary. For example, at any particular wavelength in the visible wavelength spectrum 520 the line 530-1 corresponding to the first measurement has a distance from the line 530-2 corresponding to the second measurement that is substantially equal to the distance between the two lines 530-1, 530-2 at any other wavelength in the visible wavelength spectrum 520. Similarly, any combination of two lines as shown in the graph 500 can demonstrate substantial equidistance between the two lines at any wavelength in the visible wavelength spectrum 520.

Hence, because the distances between lightness intensities of lines representing measurements taken at sequential points in time are substantially equal across the visible light spectrum, measuring lightness at any such wavelength can, in various embodiments, be used as a valid determinant of how much the cumulative usage of colorant has affected the performance (e.g., sensitivity) of the color sensing utility components. The substantially equal distance between the lightness intensities of any two lines (e.g., lines 530-1 and 530-2) can be termed an "offset" between the two lines.

At any wavelength in the visible spectrum a distance between the first line 530-1 and a subsequently measured line (e.g., line 530-N) can, in some embodiments, represent a magnitude of a difference (e.g., the offset) between the subsequently measured lightness intensity of the particular type of print medium (e.g., as shown on line 530-N) and a predetermined lightness intensity in the reflectance spectral power distribution of the particular type of print medium (e.g., as shown on the first line 530-1). In some embodiments, the magnitude of the difference (e.g., determined by the offset and/or determined as described elsewhere in the present disclosure) can be used, in various embodiments, in recalibrating the color sensing utility and/or the print engine associated therewith.

FIGS. 5B-5C illustrate examples of cumulative colorant usage affecting determinations of color parameter intensities and/or reflectance spectral power distributions according to embodiments of the present disclosure. The graph 500 illustrated in FIG. 5A represents an intensity of a color parameter (e.g., lightness) as measured on a particular type of print medium decreasing (e.g., as detected by a color sensing utility) with the cumulative usage of colorant in a print apparatus (e.g., as a result of dirtying the components of the color sensing utility and/or the known reference target).

In contrast, the graph 540 in FIG. 5B represents an intensity of a color parameter (e.g., lightness) as measured on the particular type of print medium increasing (e.g., as detected by the color sensing utility and/or interpreted by the associated print engine) with the cumulative usage of colorant in the print apparatus. Such an increase may occur as a result of recalibration of the color sensing utility and/or the print engine associated therewith by a component programmed to do so (e.g., a closed loop color (CLC) processing system, a raster image processing (RIP) system, and/or other algorithms) following detection of the progressive artifactual decrease in intensity of the color parameter shown in graph 500 illustrated in FIG. 5A.

FIG. 5B illustrates, by way of example and not by way of limitation, a graph 540 showing an effect on measured color parameter intensity 550 across a reflectance spectral power distribution caused by using colorant during execution of sequential print operations by a print apparatus. The graph 500 illustrates an example of an effect of cumulative usage of colorant in a print apparatus on the measured color parameter intensity 550 and/or reflectance spectral power distribution as determined on a linear intensity scale.

The intensity scale 550 shown on the vertical axis can, in some situations, be represented with a low of 0.8 to indicate a substantially lower value of measured intensity of the color parameter and/or reflectance spectral power distribution and can use a high of 1.0 to indicate a substantially upper value of measured intensity of the color parameter and/or reflectance spectral power distribution. From such a spectral power distribution, a number of color parameters can be calculated (e.g., lightness, chroma, hue, among others).

The graph 540 shown in FIG. 5B illustrates an example of the effect of cumulative usage of colorant and resulting artifactually-induced recalibration on the measured color parameter intensity 550 and/or reflectance spectral power distribution as determined across a wavelength spectrum 560. In some embodiments, a wavelength spectrum across which color parameter intensities and/or reflectance spectral power distributions are determined can substantially correspond to a wavelength spectrum perceivable by the human visual system (e.g., from around 400 nanometers (nm) to around 700 nm), as shown by the wavelength spectrum 560 illustrated on the horizontal axis of the graph 540 in FIG. 5B.

FIG. 5B shows a graph 540 that illustrates a representative example of cumulative usage of colorant in a print apparatus increasing the measured color parameter intensity 550, for example, as a result of artifactually recalibrating due to dirtying the components of the color sensing utility and/or the known reference target. The color parameter intensity 550 shown in the graph 540 can, in some instances, represent measurements across a visible wavelength spectrum 560 of light reflected by a particular type of substantially white print medium. In such situations, the lightness across the visible wavelength spectrum 560 of the substantially white print medium may have relatively high intensities, as displayed in the graph 540 by sequential measurements over time (e.g., lines 570-1 through 570-N) across the visible wavelength spectrum 560 having measurements between intensity values of 0.8 and 1.0, as shown on the color parameter intensity axis 550.

In the graph 540, the lower line 570-1 across the visible wavelength spectrum 560 can represent, in some embodiments of the present disclosure, measurements of lightness intensity and/or reflectance spectral power distribution of a particular type of substantially white print medium as measured around the time when the user first intends to print an image on the particular type of substantially white print media. In some embodiments, such lightness intensity and/or reflectance spectral power distribution measurements can be saved in memory to provide reference values with which later lightness intensity and/or reflectance spectral power distribution measurements of the same type of substantially white print medium can be compared.

Such reference values can, as described in the present disclosure, be utilized in recalibration of an in-service printing apparatus in a manner that can reduce an extent to which artifactually-induced recalibration affects color parameter intensity. That is, the teachings of the present disclosure can, in various embodiments, reduce a drift in color parameter intensities and/or reflectance spectral power distributions resulting from, for example, dirtying the components of the color sensing utility and/or the known reference target and resultant artifactual recalibration using systems as described in the prior art.

For instance, the lines 570-2, 570-3, and 570-N in graph 540 are intended to represent lightness intensities measured at subsequent points in time (e.g., after a particular number of images has been printed between each measurement) during which a progressively increasing cumulative amount of colorant has been used when artifactual recalibration may have been performed using systems as described in the prior art. The lightness intensity, as discernable on the color parameter intensity axis 550, may have measurements across the reflectance spectral power distribution that progressively increase, which, in some situations, may correspond to progressively increasing amounts of aerosol colorant settling on the color sensing utility components.

As illustrated in the graph 540, relative distances between each line across the visible wavelength spectrum 560, as measured on the color parameter intensity axis 550, can vary. For example, at any particular wavelength in the visible wavelength spectrum 560 the line 570-1 corresponding to the first measurement may have a distance from the line 570-2 corresponding to the second measurement that differs from the distance between the two lines 570-1, 570-2 at any other wavelength in the visible wavelength spectrum 560. Similarly, any combination of two lines as shown in the graph 540 can demonstrate varying distance between the two lines at any wavelength in the visible wavelength spectrum 560.

In contrast to FIG. 5A, which may represent an optimal situation, FIG. 5B may represent a situation where each spectral band in the visible wavelength spectrum 560 varies in intensity due to differing effects in each spectral band of, for instance, aerosol colorant settling on the color sensing utility components. Hence, because the distances between color parameter intensities (e.g., L*) of lines representing measurements taken at sequential points in time vary across the visible light spectrum, calibration can be performed, in various embodiments of the present disclosure, for each band and/or each line (e.g., lines 570-2, 570-3, and 570-N in graph 540) relative to the reference line 570-1 independently from other spectral bands and/or lines. That is, in various embodiments, independently calculated weighting factors can be applied to each spectral band and/or line to bring subsequently determined lines (e.g., lines 570-2, 570-3, and 570-N) in substantial conformity to the reference line 570-1.

For instance, in contrast to the fixed offset factor described with regard to FIG. 5A, a specific weighting compensation function can be calculated for each spectral band and/or line (e.g., as shown in FIG. 5B) by measuring a reference color parameter intensity (e.g., L*) of the particular print medium across the reflectance spectral power distribution. The specific weighting compensation function can, in various embodiments, be utilized for the appropriate band at subsequent measurements. The specific weighting compensation function also can, in various embodiments, be utilized for a number of color parameters (e.g., lightness, chroma, etc.) at a number of colors (e.g., hues), in some instances, before transforming the spectral power distribution to a particular color space.

In some embodiments, a specific weighting compensation function can be represented as: $A(\lambda)=B(\lambda)/C(\lambda)$. The components in the specific weighting compensation function just presented can be defined as:

$A(\lambda)$ are coefficients at each increment of wavelength (nm) of reference spectral response from white point of the reference print medium and current spectral response from white;

$\lambda$ is, for example, from 400 to 700 nm in increments of 20 nm, although such numbers can vary depending upon particular implementations;

$B(\lambda)$ is the reference spectral response from white at first measurement (e.g., using a particular print medium and/or external reference); and $C(\lambda)$ is the spectral response at a subsequent measurement that differs from the first measurement (e.g., after the color sensing utility has been affected by aerosol colorant).

To compensate for a subsequent and differing spectral response, the $A(\lambda)$ factor can be applied to the subsequent and differing spectral response, for instance, independently of the color measured. As such, only a white reference is sufficient to calculate the weighting compensation factors that are applicable to measurements of any colors in the spectral power distribution.

In some embodiments, the weighting compensation factor can be represented as: $D(\lambda)=A(\lambda)\times E(\lambda)$. The components in the weighting compensation factor just presented can be defined as:

$D(\lambda)$ is a compensated spectral response that can, in various embodiments, be used to calculate intensities for a number of color parameters (e.g., lightness, chroma, etc.) in a variety of color spaces;

$A(\lambda)$ are the coefficients for each spectral band, as previously calculated; and $E(\lambda)$ is a spectral response from the color sensing utility affected by aerosol colorant.

In various embodiments of the present disclosure, applying the $D(\lambda)$ weighting compensation factor can at least partially compensate for a drift in each spectral band and/or line to bring subsequently determined lines (e.g., lines 570-2, 570-3, and 570-N) in substantial conformity to the reference line 570-1, as shown in graph 540 illustrated in FIG. 5B.

FIG. 5C shows a graph 580 that illustrates a representative example of cumulative usage of colorant, among other contributing factors, in a print apparatus not substantially affecting the measured color parameter intensity. Reducing the effect of cumulative usage of colorant and other contributing factors (e.g., as illustrated in FIGS. 5A and 5B, can result from application of an offset and/or a weighting compensation factor as described in the present disclosure. For example, at least partially reducing artifactual recalibrating due to dirtying the components of the color sensing utility and/or the known reference target, as illustrated in FIG. 5B, can yield color parameter intensities and/or reflectance spectral power distributions that do not substantially differ from the predetermined and saved color parameter intensities for the particular types of print medium (e.g., as determined around the time of first using each of the particular types of print media).

For example, as illustrated in the graph 580 shown in FIG. 5C, a single line across a range of wavelengths (e.g., a visible wavelength spectrum) can represent substantially overlapping lines 590-1 through 590-N (i.e., as indicated by 590-1-N). That is, the single line 590-1-N can represent substantially overlapping lines indicating color parameter intensities and/or reflectance spectral power distributions measured from around the time of first measuring and saving the color parameter intensities for a particular type of print medium 590-1 through an unlimited number of subsequent measurements of the color parameter intensities for the particular type of print medium 590-N. The substantially overlapping nature of the multiple lines 590-1-N can, in various embodiments, result from application of an offset and/or a weighting compensation factor as described in the present disclosure.

A substantially overlapping nature of multiple lines can be measured (e.g., by a reference color sensing utility) from around a time of first measuring and saving color parameter intensities and/or a reflectance spectral power distribution for a particular type of print medium through more than two thousand print operations using the particular type of print medium. In such testing, the substantially overlapping nature of the multiple lines was maintained in a single print apparatus, even though cumulative usage of colorant, among other contributing factors, contributed to, for instance, dirtying of the components of the color sensor with aerosol colorant coming, for instance, from ink droplets used for printing the series of images.

The graphs shown in FIGS. 5A-5C display color parameter intensities and/or reflectance spectral power distributions that are relatively high across a complete wavelength spectrum (i.e., the visible wavelength spectrum), which can represent, for example, measurement of particular types of substantially white print medium and/or a substantially white reference sample. However, embodiments of the present disclosure also can be measurement, analysis, and/or compensation of particular wavelength bands within a particular wavelength spectrum. For example, various embodiments of the present disclosure can be individually applied to wavelength bands corresponding to red, green, blue, cyan, magenta, and/or yellow, among others, in various color gamuts.

A print apparatus that, as described in the present disclosure, is capable of calibrating color sensor performance can, in some embodiments, detect an amount of colorant used during printing (e.g., during printing of a particular print operation). A logic component, in various embodiments, can correlate with magnitudes of differences between the measured and the predetermined color parameter intensities detected at a number of time points a cumulative amount of colorant used. The logic component can determine a rate of increase of the magnitude of difference between the measured and the predetermined color parameter intensities relative to the cumulative amount of colorant used.

The logic component can, in some embodiments, determine from the rate of increase appropriate time points to measure the color parameter intensities to detect when the magnitude of difference between the measured and the predetermined color parameter intensities reaches a threshold. In some embodiments, the threshold can be determined by a Commission Internationale d'Eclairage (CIE) delta E 2000 color error metric exceeding a particular value, as will be appreciated by one of ordinary skill in the relevant art. The logic component can initiate recalibration when the magnitude of difference between the measured and the predetermined color parameter intensities reaches the threshold by applying a weighting factor (e.g., as determined by the magnitude of the offset) to as least partially compensate for an offset associated with the cumulative amount of colorant used.

Briefly, the CIE delta E color error metric is a tool of color science that has undergone a series of refinements, the CIE delta E 2000 version of which was developed in the year 2000. The CIE delta E 2000 color error metric compares corresponding pairs of CIELAB color parameter values, for example, a measured value compared to a saved reference value, as described in the present disclosure. The difference between the corresponding values can be a measure of error of the measured value with regard to the saved reference value. A CIE delta E color error of 1.0 can be considered around a threshold value perceivable by the human visual system in distinguishing one color parameter intensity from another color parameter intensity.

Executable instructions usable in accomplishing the functions described in the present disclosure for determining performance of a color sensor and/or a color sensing utility can, in various embodiments, be stored using a variety of storage implementations. The functions described herein can be performed using one or more logic components that, for example, use logic, software, firmware, hardware, application modules, and ASICs, or combinations of these elements, and the like, to perform the operations described herein. Embodiments as described herein are not limited to any particular operating environment or to software/firmware coded and stored in a particular programming language.

The elements described can be resident on the systems, apparatuses, and/or devices described herein, or otherwise. Logic suitable for performing embodiments of the present disclosure can be resident in one or more devices and/or locations. Processing devices used to execute operations described herein can include one or more individual modules that perform a number of functions, separate modules connected together, and/or independent modules.

In some embodiments in which one or more color sensing utilities, print engines, and/or logic components associated therewith, as described in the present disclosure, are utilized in a print apparatus, executable instructions can be used to measure a lightness intensity (e.g., L*) of a particular type of substantially white print medium with the color sensing utility of the print apparatus. The executable instructions can be used to detect a magnitude of a difference between the measured lightness intensity of the particular type of substantially white print medium and a saved determination of the lightness intensity of the particular type of substantially white print medium.

The executable instructions thereby can be used to recalibrate the color sensing utility based upon the magnitude of the difference between the measured lightness intensity and the saved determination of the lightness intensity of the particular type of substantially white print medium. Detecting the magnitude of the difference can, in various embodiments, include correlating the measured lightness intensity with a saved determination of the lightness intensity, where, in some embodiments, a number of determinations corresponding to the lightness intensity of a number of particular types of substantially white print media are saved.

Executable instructions can, in some embodiments, be used to measure the lightness intensity prior to printing an image upon the particular type of substantially white print medium. For example, in situations where the lightness intensity of a particular type of substantially white print medium can be measured and compared to the saved determination of the lightness intensity of a particular type of substantially white print medium, in order to determine performance of the color sensing utility.

In some embodiments, the executable instructions can be used to measure the lightness intensity after printing an image upon the particular type of substantially white print medium. For example, in situations where the lightness intensity of a particular type of substantially white print medium has not yet been measured and/or saved in memory. In such situations, delaying measuring and/or saving the lightness intensity until after one or more pages are printed may allow the color sensing utility, and/or components associated therewith, to warm up to an appropriate operating temperature for measuring and/or saving lightness intensities. Delaying the measuring and/or saving of lightness intensities also may reduce a customers wait time prior to output of images by the print apparatus.

Executable instructions can, in various embodiments, be used to recalibrate the color sensing utility by applying the magnitude of the difference between the measured lightness intensity and the saved determination of the lightness intensity as a weighting factor to at least partially compensate for the difference. In various embodiments, applying the weighting factor can include recalibrating the color sensing utility to sense a lightness intensity that is not substantially different from the saved determination of the lightness intensity of the particular type of substantially white print medium.

For example, the color sensing utility, print engine, and/or logic component associated therewith can determine that a measured lightness intensity differs from the predetermined and saved lightness intensity for the particular type of substantially white print medium to an extent that reaches and/or exceeds a threshold (e.g., 1.0, 2.0, 3.0, etc., CIE delta E 2000 color error metric units, among other threshold values). In such a situation, for example, the logic component can reprogram the color sensing utility and/or print engine associated therewith to sense (e.g., measure) a lightness intensity that is not substantially different from the saved determination of the lightness intensity of the particular type of substantially white print medium. Reprogramming as such can reduce an effect of a detected change in lightness intensity and/or reflectance spectral power distribution affecting accuracy and/or consistency of color reproduction in images printed by the one or more print apparatuses.

A print apparatus as described in the present disclosure can, in some embodiments, produce (e.g., print) a test sample on a particular type of print medium, the characteristics of which (e.g., color, lightness, hue, saturation, chromaticity, granularity, definition, among others) can be measured and compared to one or more corresponding reference samples saved in memory after measurement of the test sample on the particular type of print medium, in order to ascertain accuracy and/or consistency of the color sensing utility and/or the print engine associated therewith. In some embodiments, executable instructions stored in and/or used by the print apparatus can cause the print apparatus to recalibrate the color sensing utility and/or the print engine associated therewith prior to beginning a print operation and/or after completing at least a portion of the print operation. In various embodiments, measuring, comparing, and/or recalibrating can be performed using CLC processing, RIP processing, and/or GB profiling, among other algorithms.

The executable instructions can, in various embodiments, be used to apply the weighting factor across a wavelength spectrum, for example, as illustrated in FIGS. 5A-5C, sensed by the color sensing utility so as to as least partially compensate for an offset (e.g., between lines 530-1, 530-2, 530-3, and/or 530-N as shown in FIG. 5A) associated with a number of changes to the color sensing utility that have occurred since saving the determination of the lightness intensity of the particular type of substantially white print medium. The executable instructions also can, in various embodiments, be used to apply the weighting factor across the wavelength spectrum during printing by the print apparatus so as to as least partially compensate for the offset associated with the number of changes to the color sensing utility that have occurred since saving the determination of the lightness intensity of the particular type of substantially white print medium.

Figure 6:
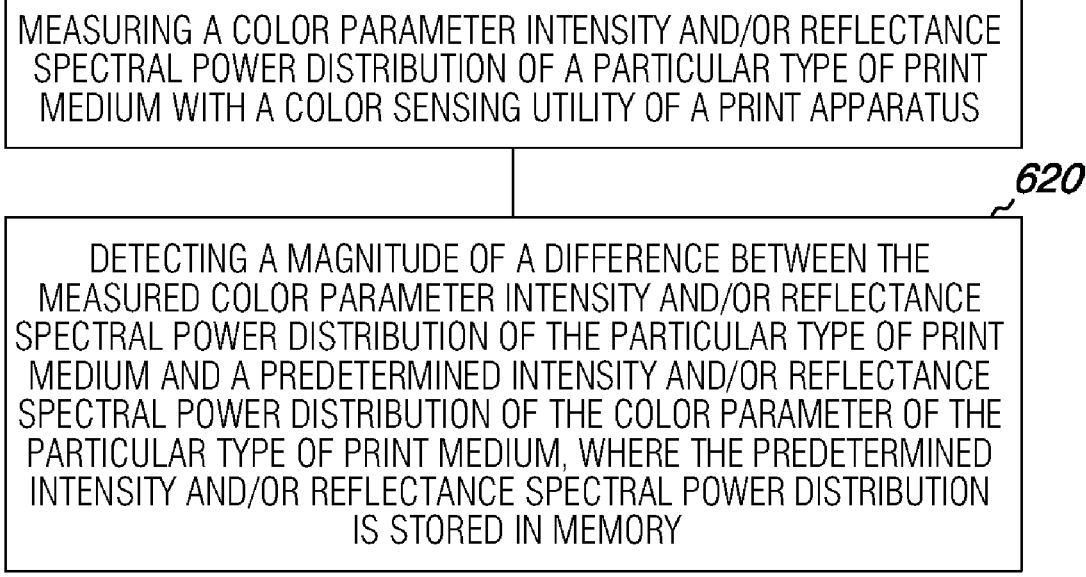
FIG. 6 is a block diagram illustrating a method of determining performance of a color sensor according to an embodiment of the present disclosure.

FIG. 6 is a block diagram illustrating a method of determining performance of a color sensor according to an embodiment of the present disclosure. Unless explicitly stated, the method embodiments described herein are not constrained to a particular order or sequence. Additionally, some of the described method embodiments, or elements thereof, can occur or be performed at the same, or at least substantially the same, point in time.

The embodiment illustrated in FIG. 6 includes measuring a color parameter intensity and/or reflectance spectral power distribution of a particular type of print medium with a color sensing utility of a print apparatus, as shown in block 610. Various embodiments can detect a magnitude of a difference between the measured color parameter intensity and/or reflectance spectral power distribution of the particular type of print medium and a predetermined intensity and/or reflectance spectral power distribution of the color parameter of the particular type of print medium, where the predetermined intensity and/or reflectance spectral power distribution is stored in memory, as shown in block 620 and as described in the present disclosure. In some embodiments, the color sensing utility and/or the print engine associated therewith can be recalibrated based upon detecting the magnitude of the difference between the measured color parameter intensity and/or reflectance spectral power distribution and the predetermined color parameter intensity and/or reflectance spectral power distribution of the particular type of print medium.

Measuring and predetermining the color parameter intensity and/or reflectance spectral power distribution of the particular type of print medium can, in various embodiments, include measuring and predetermining the color parameter intensity and/or reflectance spectral power distribution selected from a group of color parameters that can include lightness, chroma, hue, and equivalents thereof in color imaging. Measuring the color parameter intensity and/or reflectance spectral power distribution can, in some embodiments, include measuring a color parameter intensity and/or reflectance spectral power distribution of a particular type of substantially white print medium and the predetermined intensity and/or reflectance spectral power distribution can include predetermining the color parameter intensity and/or reflectance spectral power distribution of the particular type of substantially white print medium. Measuring and predetermining the color parameter intensity and/or reflectance spectral power distribution of the particular type of print medium can, in various embodiments, include measuring and predetermining the color parameter intensity and/or reflectance spectral power distribution using a color space selected from a group that includes CIELAB L*a*b*, ICC L*a*b*, Hunter Lab, and variants thereof, among others.

Detecting the magnitude of the difference between the color parameter intensities can, in some embodiments, include computing a CIE delta E 2000 color error metric, among a number of versions thereof, using the measured color parameter intensity and the predetermined color parameter intensity. In various embodiments, the color sensing utility and/or the print engine associated therewith can be recalibrated based upon detecting the magnitude of the difference between the color parameter intensities, for example, when the CIE delta E 2000 color error metric exceeds a particular value (e.g., values of 1.0, 2.0, 3.0, etc., among other decimal, and/or fractional values).

Although specific embodiments have been illustrated and described herein, those of ordinary skill in the relevant art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein, will be apparent to those of ordinary skill in the relevant art upon reviewing the above description.

The scope of the various embodiments of the present disclosure includes other applications in which the above structures and methods are used, for example, in implementations other than print apparatuses. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure need to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for determining performance of a color sensor, comprising:
    measuring a color parameter intensity and reflectance spectral power distribution of a particular type of print medium with a color sensing utility of a print apparatus; and
    detecting a magnitude of a difference between the measured color parameter intensity and reflectance spectral power distribution of the particular type of print medium and a predetermined intensity and reflectance spectral power distribution of the color parameter of the particular type of print medium, where the predetermined intensity and reflectance spectral power distribution is stored in memory.

2. The method of claim 1, where the method includes recalibrating the color sensing utility based upon detecting the magnitude of the difference between the measured color parameter intensity and reflectance spectral power distribution and the predetermined color parameter intensity and reflectance spectral power distribution of the particular type of print medium.

3. The method of claim 1, where measuring the color parameter intensity and reflectance spectral power distribution includes measuring a color parameter intensity and reflectance spectral power distribution of a particular type of substantially white print medium and the predetermined intensity and reflectance spectral power distribution includes predetermining the color parameter intensity and reflectance spectral power distribution of the particular type of substantially white print medium.

4. The method of claim 3, where measuring and predetermining the color parameter intensity and reflectance spectral power distribution of the particular type of print medium includes measuring and predetermining the color parameter intensity and reflectance spectral power distribution selected from a group of color parameters that includes lightness, chroma, hue, and equivalents thereof in color imaging.

5. The method of claim 3, where measuring and predetermining the color parameter intensity and reflectance spectral power distribution of the particular type of print medium includes measuring and predetermining the color parameter intensity and reflectance spectral power distribution using a color space selected from a group that includes CIELAB L*a*b*, ICC L*a*b*, Hunter Lab, and variants thereof.

6. The method of claim 2, where detecting the magnitude of the difference between the color parameter intensities includes computing a CIE delta E 2000 color error metric using the measured color parameter intensity and the predetermined color parameter intensity.

7. A non-transitory computer-readable data storage medium having executable instructions stored thereon that when executed by a processor causes a method of determining performance of a color sensor to be performed, the method comprising:
    measuring a lightness intensity and reflectance spectral power distribution of a particular type of substantially white print medium with a color sensing utility of a print apparatus;
    detecting a magnitude of a difference between the measured lightness intensity and reflectance spectral power distribution of the particular type of substantially white print medium and a saved determination of the lightness intensity and reflectance spectral power distribution of the particular type of substantially white print medium; and
    recalibrating the color sensing utility based upon the magnitude of the difference between the measured lightness intensity and reflectance spectral power distribution and the saved determination of the lightness intensity and reflectance spectral power distribution of the particular type of substantially white print medium.

8. The non-transitory computer-readable data storage medium of claim 7, where measuring the lightness intensity and reflectance spectral power distribution of the particular type of substantially white print medium includes measuring the lightness intensity and reflectance spectral power distribution prior to printing an image upon the particular type of substantially white print medium.

9. The non-transitory computer-readable data storage medium of claim 7, where measuring the lightness intensity and reflectance spectral power distribution of the particular type of substantially white print medium includes measuring the lightness intensity and reflectance spectral power distribution after printing an image upon the particular type of substantially white print medium.

10. The non-transitory computer-readable data storage medium of claim 8, where recalibrating the color sensing utility includes applying the magnitude of the difference between the measured lightness intensity and reflectance spectral power distribution and the saved determination of the lightness intensity and reflectance spectral power distribution as a weighting factor to at least partially compensate for the difference.

11. The non-transitory computer-readable data storage medium of claim 7, where detecting the magnitude of the difference includes correlating the measured lightness intensity and reflectance spectral power distribution with a saved determination of the lightness intensity and reflectance spectral power distribution, where a number of determinations corresponding to the lightness intensity and reflectance spectral power distribution of a number of particular types of substantially white print media are saved.

12. A print apparatus capable of calibrating color sensor performance, comprising:
    a color sensing utility that includes:
    a light source to illuminate a particular type of print medium upon which an image is to be printed;

a photodetector to detect a spectrum of colors reflected by the particular type of print medium;

memory to save results of a number of color parameter intensities detected throughout the spectrum of colors; and a logic component that:

measures the intensity of the number of color parameters of the particular type of print medium;

detects a magnitude of a difference between a measured color parameter intensity of the particular type of print medium and a predetermined intensity of the color parameter of the particular type of print medium; and recalibrates the color sensing utility based upon detecting the magnitude of the difference between the measured color parameter intensity and the predetermined intensity of the color parameter of the particular type of print medium.

13. The apparatus of claim 12, where the light source illuminates a particular 15 type of substantially white print medium, the photodetector detects the lightness intensity thereof, and the memory saves a number of lightness intensity results of the particular type of substantially white print medium.

14. The apparatus of claim 13, where the predetermined intensity of the color parameter includes a predetermined lightness intensity of a number of particular types of substantially white print media input into the memory by a supplier of the color sensing utility.

15. The apparatus of claim 13, where the predetermined intensity of the color parameter includes a lightness intensity being measured and input into the memory around a time when a user first intends to print an image on the particular type of substantially white print media.

16. The apparatus of claim 12, where the apparatus detects an amount of colorant used during printing.

17. The apparatus of claim 16, where the logic component correlates with magnitudes of differences between the measured and the predetermined color parameter intensities detected at a number of time points a cumulative amount of colorant used.

18. The apparatus of claim 17, where the logic component determines a rate of increase of the magnitude of difference between the measured and the predetermined color parameter intensities relative to the cumulative amount of colorant used.

19. The apparatus of claim 18, where the logic component determines from the rate of increase appropriate time points to measure the color parameter intensities to detect when the magnitude of difference between the measured and the predetermined color parameter intensities reaches a threshold.

20. The apparatus of claim 19, where the logic component initiates recalibration when the magnitude of difference between the measured and the predetermined color parameter intensities reaches the threshold by applying a weighting factor to as least partially compensate for an offset associated with the cumulative amount of colorant used.

* * * * *

UNITED STATES PATENT AND TRADEMARK OFFICE
CERTIFICATE OF CORRECTION

| | |
|---|---|
| PATENT NO. | : 8,004,680 B2 |
| APPLICATION NO. | : 12/243986 |
| DATED | : August 23, 2011 |
| INVENTOR(S) | : Oscar Martinez |

It is certified that error appears in the above-identified patent and that said Letters Patent is hereby corrected as shown below:

In column 29, line 20, in Claim 13, after "particular" delete "15".

In column 30, line 26, in Claim 20, delete "as" and insert -- at --, therefor.

Signed and Sealed this
Thirty-first Day of July, 2012

David J. Kappos
*Director of the United States Patent and Trademark Office*